United States Patent
Araki et al.

(10) Patent No.: US 6,716,497 B2
(45) Date of Patent: *Apr. 6, 2004

(54) HEAT-RESISTANT SCATTERING-PREVENTING COMPOSITE MATERIALS

(75) Inventors: Takayuki Araki, Settsu (JP); Yoshito Tanaka, Settsu (JP); Masahiro Kumegawa, Settsu (JP); Noritoshi Oka, Settsu (JP); Hisato Sanemasa, Settsu (JP); Tetsuo Shimizu, Settsu (JP)

(73) Assignee: Daikin Industries, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/424,084

(22) PCT Filed: May 18, 1998

(86) PCT No.: PCT/JP98/02185

§ 371 (c)(1),
(2), (4) Date: Nov. 19, 1999

(87) PCT Pub. No.: WO98/52748

PCT Pub. Date: Nov. 26, 1998

(65) Prior Publication Data

US 2003/0008151 A1 Jan. 9, 2003

(30) Foreign Application Priority Data

May 21, 1997 (JP) .................................. 9-131155

(51) Int. Cl.[7] .................... B32B 17/10; H01J 61/35
(52) U.S. Cl. ................ 428/34.7; 428/421; 428/422; 428/426; 362/457; 362/458; 220/21 R; 313/634; 313/635
(58) Field of Search .................. 428/421, 422, 428/426, 441, 921, 34.7; 362/367, 457, 458; 220/2.1 R; 313/17, 25, 26, 573, 580, 634, 635

(56) References Cited

U.S. PATENT DOCUMENTS

| | | | |
|---|---|---|---|
| 3,799,996 A | * 3/1974 | Bloch | 502/174 |
| 4,459,506 A | * 7/1984 | Beck | 313/315 |
| 4,544,720 A | 10/1985 | Ohmori et al. | |
| 4,804,886 A | * 2/1989 | Nolan et al. | 313/489 |
| 5,043,626 A | * 8/1991 | Nolan | 313/489 |
| 5,059,720 A | * 10/1991 | Hung | 568/674 |
| 5,230,954 A | * 7/1993 | Sakamoto et al. | 428/332 |
| 5,243,251 A | * 9/1993 | Inukai et al. | 313/25 |
| 5,304,617 A | * 4/1994 | Kodama et al. | 526/255 |
| 5,374,683 A | 12/1994 | Morgan | |
| 5,670,593 A | * 9/1997 | Araki et al. | 526/245 |
| 5,750,626 A | 5/1998 | Shimizu et al. | |
| 5,869,574 A | 2/1999 | Shimizu et al. | |
| 5,986,150 A | 11/1999 | Araki et al. | |
| 6,054,537 A | 4/2000 | Shimizu et al. | |
| 6,069,215 A | 5/2000 | Araki et al. | |
| 6,225,399 B1 | 5/2001 | Araki et al. | |

FOREIGN PATENT DOCUMENTS

| | | |
|---|---|---|
| JP | 3-203640 | 9/1991 |
| JP | 4-33904 | 2/1992 |
| JP | 5-1118 | 1/1993 |
| JP | 5-194668 | 8/1993 |
| JP | 6-263951 | 9/1994 |
| JP | 9-157578 | 6/1997 |
| JP | 9-157616 | 6/1997 |

OTHER PUBLICATIONS

Alger, Polymer Science Dictionary, p. 493, Apr. 1999.*
International Preliminary Examination Report for PCT/JP98/02185.

* cited by examiner

Primary Examiner—Ramsey Zacharia
(74) Attorney, Agent, or Firm—Sughrue Mion, PLLC

(57) ABSTRACT

A heat resistant scattering-preventing composite material is produced by applying, to a substrate, a material comprising a fluorine-containing ethylenic polymer having functional group which is prepared by copolymerizing (a) 0.05 to 30% by mole of at least one of fluorine-containing ethylenic monomers having at least one functional group selected from the group consisting of hydroxyl, carboxyl, a carboxylic salt group, a carboxylic ester group and epoxy, and (b) 70 to 99.95% by mole of at least one of fluorine-containing ethylenic monomers which do not have said functional group. The heat resistant scattering-preventing composite material is produced by applying, to the substrate, the material comprising the fluorine-containing polymer having an excellent adhesive property to the substrate without necessitating complicated steps.

8 Claims, 5 Drawing Sheets

HEAT-RESISTANT SCATTERING-PREVENTING COMPOSITE MATERIALS

TECHNICAL FIELD

The present invention relates to a heat resistant scattering-preventing composite material which is produced by applying, to a substrate, a fluorine-containing polymer excellent in heat resistance, non-sticking property, transparency (property for exhibiting clear surface pattern), stain-proofing property, water and oil repellency and particularly adhesive property to the substrate. Further the present invention particularly relates to a heat resistant scattering-preventing composite material which is suitably used, by utilizing its characteristic of heat resistance, for products scattering when broken, for example, illumination apparatuses such as electric bulbs, displaying apparatuses such as CRT and liquid crystal display, building materials such as window glass, cooking wares such as glass containers, and the like.

BACKGROUND ART

An electric bulb and a lamp shade are made of mainly glass or polycarbonate from the viewpoint of heat resistance, elasticity, and further light transmittancy (transparency). However there is a danger that those materials are easily broken and broken pieces are scattered.

Prevention of scattering of the broken pieces are tried by laminating with a film of synthetic resin such as polyvinyl butyral, applying a silicon resin coating or enclosing an electric bulb and a vicinity thereof with a net.

However since an electric bulb becomes high in temperature (from about 50° to about 150° C.) while it is turned on, in a method of laminating a conventional film, heat resistance of the film is insufficient (A temperature for continuous use is low) and deterioration of the laminated film such as softening, foaming, lowering of strength and coloring occurs. Thus functions thereof cannot be exhibited fully during long-term use required basically. In case of a silicon resin, staining easily occurs, transparency is lowered and a problem with light transmittancy occurs even when a metal net is used.

A laminated glass or wired glass of polyvinyl butyral is used on glass for cars, glass for green house exposed directly to sun light and explosion-proof glass for building in addition to glass for illumination. Particularly for application to building, those materials are insufficient in view of light weight and non-flammability required.

On the contrary, a fluorine-containing resin is excellent particularly in heat resistance, stain-proofing property, non-sticking property, chemical resistance and weather resistance, and is said to be a suitable material when being in the form of film or coating composition.

However the fluorine-containing resin has an essential problem that due to its non-sticking property, its adhesion to a substrate of glass or synthetic resin is not sufficient.

When adhering a fluorine-containing resin coating composition to a glass substrate, etc. requiring transparency, an improvement of adhesion has been tried by treating a substrate surface with a silane coupling agent or adding a silicone resin to a fluorine-containing resin coating composition (JP-B-54-42366, JP-A-5-177768, etc.). However enhancement of adhesion is insufficient, heat resistance is lowered, and separation of film, foaming and coloring easily arise at sintering or during use at high temperature.

Particularly JP-B-3-80741 discloses an electric bulb coated with a fluorine-containing resin powder coating composition, in which roughening of a glass substrate to be adhered, coating of a primer such as silane coupling agent and coating of a fluorine-containing resin powder coating composition containing glass fiber are carried out. However there are problems with complicated steps, lowering of light transmittancy by roughening and due to glass fiber, and coloring of a primer. The fluorine-containing resin is inherently insufficient in adhesion.

On the contrary, fluorine-containing resin coating compositions prepared by copolymerizing a hydrocarbon monomer (containing no fluorine) containing functional group such as hydroxyl or carboxyl have been discussed. However since those coating compositions were originally studied mainly for a purpose of weather resistance, it is difficult to use them for application requiring heat resistance (for example, 200° to 350° C.) which is directed by the present invention.

Namely with respect to a polymer prepared by copolymerizing a hydrocarbon monomer (containing no fluorine) having functional group, thermal decomposition easily occurs on components of the monomer at the time of processing at high temperature or during use, and thus coating film failure, coloring, foaming, separation, etc. arise, which lowers heat resistance and property for preventing scattering and makes it impossible to attain purposes of coating a fluorine-containing resin.

Further fluorine-containing polymers are generally insufficient in mechanical strength and dimensional stability, and high in price. In order to minimize those disadvantages and make the best use of the above-mentioned merits which the fluorine-containing polymer possesses inherently, investigations have been made also with respect to its use in the form of film.

However the fluorine-containing polymer inherently has low adhesive force as mentioned above, and it is difficult to adhere the fluorine-containing polymer directly to other material (substrate). For example, even if the adhering is tried by thermo-processing, adhesive strength of the fluorine-containing polymer is not enough, or even if the polymer has adhesive force to a certain extent, such an adhesive force is apt to vary depending on kind of the substrate. Thus in many cases, reliability on the adhesive strength of the fluorine-containing polymer has been not so enough.

In order to adhere the fluorine-containing polymer film to a substrate, mainly the following methods have been studied:

1. a method for physically roughening a surface of substrate by sand blasting, etc.,
2. a method for surface-treating a fluorine-containing resin film by chemical treatment such as sodium etching, plasma treatment, photochemical treatment, etc.,
3. a method for adhering by using an adhesive, and other methods.

With respect to the methods 1 and 2 above, surface-treating steps are required, and the steps are complicated and productivity is poor. Also kinds and shapes of substrates are restricted. Further the obtained adhesive force is insufficient, and heat resistance which the fluorine-containing resin inherently possesses is easily lowered. Also the method of using a chemical such as sodium etching has a problem with safety.

Use of an adhesive in the method 3 above has also been discussed. A usual hydrocarbon type (non-fluorine-containing) adhesive does not have enough adhesive property and its heat resistance is insufficient. Thus a hydrocarbon type adhesive cannot stand under conditions for adhering of a fluorine-containing polymer film which requires molding and processing at high temperature, and peeling due to decomposition of the adhesive and coloring occur. Since the above-mentioned composite material produced by using an adhesive also is insufficient in heat resistance, chemical resistance and water resistance of its adhesive layer, it cannot maintain adhesive force due to a change in temperature and environment, and lacks in reliability.

On the contrary, adhesion by using an adhesive composition comprising a fluorine-containing polymer having functional group is discussed.

For example, it is reported that a fluorine-containing polymer prepared by graft-polymerizing, to the fluorine-containing polymer, a hydrocarbon monomer which has carboxyl represented by maleic anhydride and vinyltrimethoxysilane, a residual group of carbonic acid, epoxy or a hydrolyzable silyl group, is used as an adhesive (for example, JP-A-7-18035, JP-A-7-25952, JP-A-7-25954, JP-A-7-173230, JP-A-7-173446, JP-A-7-173447) and that an adhesive composition comprising a fluorine-containing copolymer prepared by copolymerizing a hydrocarbon monomer having functional group such as hydroxyalkyl vinyl ether with tetrafluoroethylene or chlorotrifluoroethylene and an isocyanate hardening agent is cured and used as an adhesive between vinyl chloride resin and corona-discharged ETFE (for example, JP-A-7-228848).

The above-mentioned adhesive composition comprising a fluorine-containing resin prepared by graft-polymerizing or copolymerizing a hydrocarbon monomer having functional group does not have enough heat resistance, and thus at the time of processing a composite material comprising the adhesive composition and a fluorine-containing resin film at high temperature or during use at high temperature, decomposition and foaming occur, thereby causing reduction of adhesive strength, peeling and coloration. In case of the adhesive composition disclosed in JP-A-7-228848, it is necessary to corona-discharge the fluorine-containing resin film.

As mentioned above, there have been no material for heat resistant scattering-preventing composite material which assures strong adhesion to a substrate while maintaining transparency.

In view of the above-mentioned facts, an object of the present invention is to provide a heat resistant scattering-preventing composite material which is produced by applying, to a substrate, a material comprising a fluorine-containing polymer being excellent in adhesion to the substrate without necessitating complicated steps.

Further the heat resistant scattering-preventing composite material of the present invention is excellent in transparency (property for exhibiting clear surface pattern), non-sticking property, stain-proofing property, chemical resistance, weather resistance, water and oil repellency, stain removing property, rust preventing property and antibacterial property.

DISCLOSURE OF THE INVENTION

The present invention relates to a heat resistant scattering-preventing composite material which is produced by applying, to a substrate, a material comprising a fluorine-containing ethylenic polymer having functional group and prepared by copolymerizing:

(a) 0.05 to 30% by mole of at least one of fluorine-containing ethylenic monomers having at least one functional group selected from the group consisting of hydroxyl, carboxyl, a carboxylic salt group, a carboxylic ester group and epoxy and (b) 70 to 99.95% by mole of at least one of fluorine-containing ethylenic monomers having no functional group mentioned above.

In that case, it is preferable that the above-mentioned fluorine-containing ethylenic monomer (a) having functional group is at least one of fluorine-containing ethylenic monomers represented by the formula (1):

$$CX_2=CX^1-R_f-Y \tag{1}$$

wherein Y is $-CH_2OH$, $-COOH$, a carboxylic salt group, a carboxylic ester group or epoxy, X and $X^1$ are the same or different and each is hydrogen atom or fluorine atom, $R_f$ is a divalent fluorine-containing alkylene group having 1 to 40 carbon atoms, a fluorine-containing oxyalkylene group having 1 to 40 carbon atoms, a fluorine-containing alkylene group having ether bond and 1 to 40 carbon atoms or a fluorine-containing oxyalkylene group having ether bond and 1 to 40 carbon atoms.

Further it is preferable that the fluorine-containing ethylenic monomer (b) having no functional group mentioned above is tetrafluoroethylene.

Further it is preferable that the fluorine-containing ethylenic monomer (b) having no functional group mentioned above is a monomer mixture comprising 85 to 99.7% by mole of tetrafluoroethylene and 0.3 to 15% by mole of a monomer represented by the formula (2):

$$CF_2=CF-R_f^1 \tag{2}$$

wherein $R_f^1$ is $CF_3$ or $OR_f^2$, in which $R_f^2$ is a perfluoroalkyl group having 1 to 5 carbon atoms.

Further it is preferable that the fluorine-containing ethylenic monomer (b) having no functional group mentioned above is a monomer mixture comprising 40 to 80% by mole of tetrafluoroethylene, 20 to 60% by mole of ethylene and 0 to 15% by mole of other monomer copolymerizable with those monomers.

In the present invention, it is preferable that the fluorine-containing ethylenic polymer having functional group is applied to a substrate in the form of a coating, aqueous dispersion, powder coating or film.

Further the substrate may be a ceramic such as glass and a synthetic resin.

The heat resistant scattering-preventing composite material of the present invention can be suitably used for appliances and parts becoming high in temperature and being easily broken, for example, electric bulbs and further for fire-protection safety glass requiring non-flammability and fire resistance.

BEST MODE FOR CARRYING OUT THE INVENTION

Figure 1:
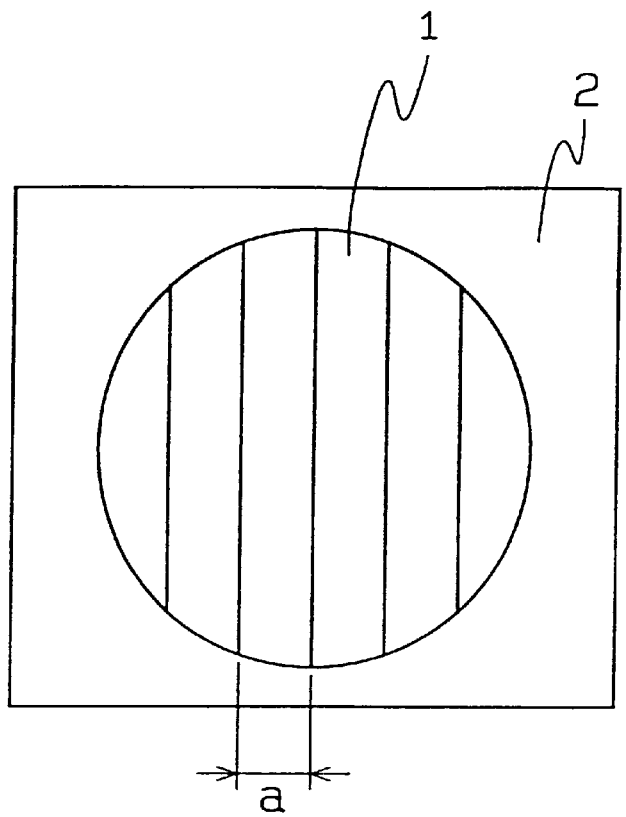
FIG. 1 is a diagrammatic plan view of an adhered sample made to measure adhesive strength in Example 1 of the present invention.

The heat resistant scattering-preventing composite material of the present invention is one produced by applying, to a substrate, a material comprising a fluorine-containing ethylenic polymer having functional group and prepared by copolymerizing:

(a) 0.05 to 30% by mole of at least one of fluorine-containing ethylenic monomers having at least one functional group selected from the group consisting of hydroxyl, carboxyl, a carboxylic salt group, a carboxylic ester group and epoxy and (b) 70 to 99.95% by mole of at least one of fluorine-containing ethylenic monomers having no functional group mentioned above.

The above-mentioned material comprising a fluorine-containing ethylenic polymer having functional group has surprisingly strong adhesion in the form of coating or film to glass, ceramic and other substrates which are easily broken, even without use of an adhesive, surface-treatment on the substrate, formation of a primer layer and addition of a component having adhesive property in the material.

With respect to the fluorine-containing ethylenic polymer having functional group which is used for preparing the composite material of the present invention, it is important to copolymerize (a) the above-mentioned fluorine-containing ethylenic monomer having functional group and (b) the fluorine-containing ethylenic monomers having no functional group mentioned above to introduce the functional group into the fluorine-containing polymer, thereby making it possible to give excellent adhesive force directly to surfaces of various substrates, to which adhesion has been difficult or impossible. Namely as compared with a fluorine-containing polymer prepared by copolymerizing a non-fluorine-containing monomer having functional group, the fluorine-containing polymer of the present invention is excellent in heat resistance, and decomposition at processing at high temperature (for example, 200° to 400° C.) can be inhibited more and a large adhesive strength can be obtained. Further a coating layer being free from coloring, foaming, pin hole caused thereby and leveling failure can be formed on a substrate. Also in case where the composite material is used at high temperature, adhesive property is maintained and a coating layer failure such as coloring, whitening, foaming or pin hole is difficult to arise.

The above-mentioned fluorine-containing polymer having functional group has excellent characteristics such as not only heat resistance and transparency thereof but also chemical resistance, non-sticking property, stain-proofing property, friction resistance and weather resistance of a fluorine-containing polymer and can give such excellent characteristics to a coating film without lowering them.

Then the fluorine-containing ethylenic copolymer having functional group which is a material for the composite material of the present invention is explained below.

The functional group of the fluorine-containing ethylenic polymer having functional group is at least one functional group selected from the group consisting of hydroxyl, carboxyl, a carboxylic salt group, a carboxylic ester group and epoxy, and provides the polymer with adhesion to various substrates by its effect. Kinds and combination of the functional groups are optionally selected depending on kind of a surface of the substrate and purpose and application. From the viewpoint of heat resistance, hydroxyl is most preferable.

Examples of the preferred fluorine-containing ethylenic monomer (a) having functional group which is one of components constituting the fluorine-containing ethylenic polymer having functional group are fluorine-containing ethylenic monomers having functional group which are represented by the formula (1):

$$CX_2=CX^1-R_f-Y \qquad (1)$$

wherein Y is —$CH_2OH$, —COOH, a carboxylic salt group, a carboxylic ester group or epoxy, X and $X^1$ are the same or different and each is hydrogen atom or fluorine atom, $R_f$ is a divalent alkylene group having 1 to 40 carbon atoms, a fluorine-containing oxyalkylene group having 1 to 40 carbon atoms, a fluorine-containing alkylene group having ether bond and 1 to 40 carbon atoms or a fluorine-containing oxyalkylene group having ether bond and 1 to 40 carbon atoms.

Examples of the fluorine-containing ethylenic monomer (a) having functional group are one represented by the formula (3):

$$CF_2=CF-R_f^3-Y \qquad (3)$$

wherein Y is as defined in the above formula (1), $R_f^3$ is a divalent fluorine-containing alkylene group having 1 to 40 carbon atoms or $OR_f^4$, in which $R_f^4$ is a divalent fluorine-containing alkylene group having 1 to 40 carbon atoms or a divalent fluorine-containing alkylene group having ether bond and 1 to 40 carbon atoms, one represented by the formula (4):

$$CF_2=CFCF_2-OR_f^5-Y \qquad (4)$$

wherein Y is as defined in the above formula (1), $R_f^5$ is a divalent fluorine-containing alkylene group having 1 to 39 carbon atoms or a divalent fluorine-containing alkylene group having ether bond and 1 to 39 carbon atoms, one represented by the formula (5):

$$CH_2=CFCF_2-R_f^6-Y \qquad (5)$$

wherein Y is as defined in the above formula (1), $R_f^6$ is a divalent fluorine-containing alkylene group having 1 to 39 carbon atoms or $OR_f^7$, in which $R_f^7$ is divalent fluorine-containing alkylene group having 1 to 39 carbon atoms or a divalent fluorine-containing alkylene group having ether bond and 1 to 39 carbon atoms, one represented by the formula (6):

$$CH_2=CH-R_f^8-Y \qquad (6)$$

wherein Y is as defined in the above formula (1), $R_f^8$ is a divalent fluorine-containing alkylene group having 1 to 40 carbon atoms, or the like monomer.

From the viewpoint that copolymerizability with the fluorine-containing ethylenic monomer (b) having no functional group mentioned above is comparatively good and that heat resistance of the obtained polymer is not lowered remarkably, the fluorine-containing ethylenic monomers having functional group and represented by the formulae (3) to (6) are preferable.

Among them, from the viewpoint of good copolymerizability with the fluorine-containing ethylenic monomer (b) having no functional group mentioned above and heat resistance of the obtained polymer, the compounds of the formulae (3) and (5) are preferable, and the compound of the formula (5) is particularly preferable.

Examples of the fluorine-containing ethylenic monomer having functional group and represented by the formula (3) are:

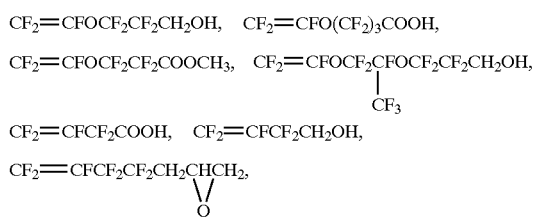

and the like.

Examples of the fluorine-containing ethylenic monomer having functional group and represented by the formula (4) are:

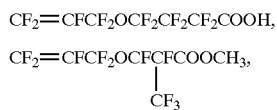

and the like.

Examples of the fluorine-containing ethylenic monomer having functional group and represented by the formula (5) are:

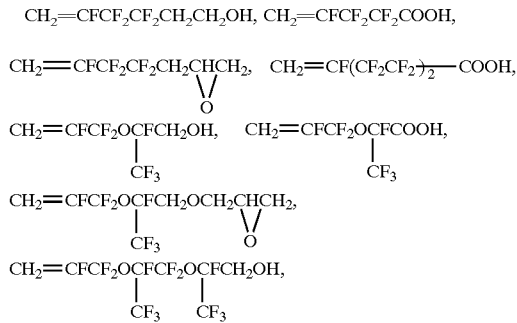

and the like.

Examples of the fluorine-containing ethylenic monomer having functional group and represented by the formula (6) are:

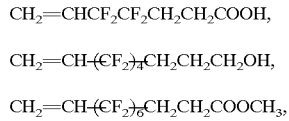

and the like.

In addition, there are:

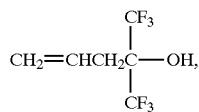

and the like.

The fluorine-containing ethylenic monomer (a) having functional group is copolymerized with the fluorine-containing ethylenic monomer (b) having no functional group which the monomer (a) has. The fluorine-containing ethylenic monomer (b) is preferably selected from monomers having no functional group. The monomer (b) can be optionally selected from known monomers, and gives in addition to excellent heat resistance, chemical resistance, non-sticking property, stain-proofing property and friction resistance to the polymer.

Examples of the fluorine-containing ethylenic monomer (b) are tetrafluoroethylene, a monomer represented by the formula (2): $CF_2=CF-R_f^1$, wherein $R_f^1$ is $CF_3$ or $OR_f^2$, in which $R_f^2$ is a perfluoroalkyl group having 1 to 5 carbon atoms, chlorotrifluoroethylene, vinylidene fluoride, vinyl fluoride, hexafluoroisobutene,

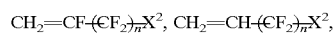

wherein $X^2$ are selected from hydrogen atom, chlorine atom and fluorine atom, n is an integer of 1 to 5, and the like.

In addition to the fluorine-containing ethylenic monomer (a) having functional group and the fluorine-containing ethylenic monomer (b) having no functional group mentioned above, an ethylenic monomer having no fluorine atom may be copolymerized in the range not lowering heat resistance and chemical resistance. In that case, it is preferable that the ethylenic monomer having no fluorine atom is selected from ethylenic monomers having not more than 5 carbon atoms in order not to lower heat resistance. Examples of such an ethylenic monomer are ethylene, propylene, 1-butene, 2-butene, and the like.

A content of the fluorine-containing ethylenic monomer (a) having functional group in the fluorine-containing ethylenic polymer having functional group which is used in the present invention is from 0.05 to 30% by mole on the basis of the total amount of monomers in the polymer. Further the content is optionally selected depending on kind of the surface of a substrate requiring heat resistance and property for preventing scattering, shape of the substrate, coating method, film forming method and conditions and further depending on purposes and applications of equipment to which the composite material is applied. The content of the fluorine-containing ethylenic monomer (a) having functional group is preferably from 0.05 to 20% by mole, particularly preferably from 0.1 to 10% by mole.

When the content of the fluorine-containing ethylenic monomer (a) having functional group is less than 0.05% by mole, sufficient adhesion to the substrate surface is difficult to obtain, and separation easily occurs due to temperature change and permeation of chemicals. When more than 30% by mole, heat resistance is lowered and there occur adhesion failure, coloring, foaming and pin hole at sintering at high temperature or during use at high temperature, thus easily causing separation of a coating layer and elution due to decomposition.

Examples of the preferred fluorine-containing ethylenic polymer having functional group used in the present invention are as follows.

(I) A polymer comprising 0.05 to 30% by mole of the fluorine-containing ethylenic monomer (a) having functional group and 70 to 99.95% by mole of tetrafluoroethylene (reactive PTFE).

The polymer is the most excellent in non-sticking property and chemical resistance in addition to heat resistance, and further is superior from the viewpoint of friction resistance.

(II) A polymer comprising 0.05 to 30% by mole of the fluorine-containing ethylenic monomer (a) having functional group based on the total amount of monomers, and further based on the total amount of monomers excluding the monomer (a), 85 to 99.7% by mole of tetrafluoroethylene and 0.3 to 15% by mole of the monomer represented by the formula (2):

$$CF_2=CF-R_f^1 \qquad (2)$$

wherein $R_f^1$ is $CF_3$ or $OR_f^2$, in which $R_f^2$ is a perfluoroalkyl group having 1 to 5 carbon atoms. For example, there is a tetrafluoroethylene-perfluoro(alkyl vinyl ether) copolymer having functional group (reactive PFA) or a tetrafluoroethylene-hexafluoropropylene polymer having functional group (reactive FEP).

The polymer has heat resistance, chemical resistance and non-sticking property nearly equivalent to those of the above-mentioned reactive PTFE (I), and further is superior from the points of possessing transparency and being melt-processable and from the viewpoint that even when coated in the form of coating, it is possible to make the coating film transparent and its surface smooth by heating.

(III) A polymer comprising 0.05 to 30% by mole of the fluorine-containing ethylenic monomer (a) having functional group based on the total amount of monomers, and further based on the total amount of monomers excluding the monomer (a), 40 to 80% by mole of tetrafluoroethylene, 20 to 60% by mole of ethylene and 0 to 15% by mole of other copolymerizable monomer (ethylene-tetrafluoroethylene polymer having functional group (reactive ETFE)).

The polymer is superior from the viewpoint of stainproofing property, weather resistance and transparency in addition to excellent heat resistance, and further excellent mechanical strength, hardness and rigidity and from the point that molding and combining with other substrate (lamination, etc.) are easy because of good melt-flowability.

In case where a glass material having low resistance to rapid cooling and heating is used on the heat resistant scattering-preventing composite material of the present invention, a fluorine-containing polymer having functional group which is relatively low in melting point is preferred from the viewpoint of processability and handling of glass material at processing. The fluorine-containing polymer having functional group is optionally selected depending on purpose, application and method of use, and a crystalline melting point or glass transition temperature thereof is not more than 270° C., preferably not more than 230° C., particularly preferably not more than 200° C.

Examples of the fluorine-containing ethylenic polymer having a low melting point (or a glass transition temperature) which is used for the heat resistant scattering-preventing composite material of the present invention are;

(IV) a copolymer comprising 0.5 to 30% by mole of the fluorine-containing ethylenic monomer (a) having functional group based on the total amount of monomers and tetrafluoroethylene and ethylene as monomers other than the monomer (a), (V) a polymer comprising 0.5 to 30% by mole of the fluorine-containing ethylenic monomer (a) having functional group based on the total amount of monomers and vinylidene fluoride as a monomer other than the monomer (a), and (VI) a copolymer comprising 0.5 to 30% by mole of the fluorine-containing ethylenic monomer (a) having functional group based on the total amount of monomers and tetrafluoroethylene and the monomer represented by the formula (2):

$$CF_2=CF-R_f^1 \qquad (2)$$

wherein $R_f^1$ is $CF_3$ or $OR_f^2$, in which $R_f^2$ is a perfluoroalkyl group having 1 to 5 carbon atoms as monomers other than the monomer (a). Among (IV), (V) and (VI), those having a crystalline melting point or glass transition temperature of not more than 270° C., preferably not more than 230° C., particularly preferably not more than 200° C. are selected.

Preferred polymers (IV) are;

(IV-1) a polymer comprising 0.5 to 30% by mole of the fluorine-containing ethylenic monomer (a) having functional group based on the total amount of monomers, and further based on the total amount of monomers excluding the monomer (a), 62 to 80% by mole of tetrafluoroethylene unit, 20 to 38% by mole of ethylene unit and 0 to 10% by mole of other monomer unit, and (IV-2) a polymer comprising 0.5 to 30% by mole of the fluorine-containing ethylenic monomer (a) having functional group based on the total amount of monomers, and further based on the total amount of monomers excluding the monomer (a), 30 to 80% by mole of tetrafluoroethylene unit, 10 to 60% by mole of ethylene unit, 10 to 30% by mole of hexafluoropropylene unit and 0 to 10% by mole of other monomer.

Preferred polymer (V) is a polymer comprising 0.5 to 30% by mole of the fluorine-containing ethylenic monomer (a) having functional group based on the total amount of monomers, and further based on the total amount of monomers excluding the monomer (a), 10 to 100% by mole of vinylidene fluoride unit, 0 to 80% by mole of tetrafluoroethylene unit, and 0 to 30% by mole of one or more units of hexafluoropropylene or chlorotrifluoroethylene. Examples thereof are;

(V-1) polyvinylidene fluoride having functional group mentioned above, (V-2) a polymer comprising 0.5 to 30% by mole of the fluorine-containing ethylenic monomer (a) having functional group based on the total amount of monomers, and further based on the total amount of monomers excluding the monomer (a), 30 to 99% by mole of vinylidene fluoride unit and 1 to 70% by mole of tetrafluoroethylene unit, (V-3) a polymer comprising 0.5 to 30% by mole of the fluorine-containing ethylenic monomer (a) having functional group based on the total amount of monomers, and further based on the total amount of monomers excluding the monomer (a), 60 to 90% by mole of vinylidene fluoride unit, 0 to 30% by mole of tetrafluoroethylene unit and 1 to 20% by mole of chlorotrifluoroethylene unit, (V-4) a polymer comprising 0.5 to 30% by mole of the fluorine-containing ethylenic monomer (a) having functional group based on the total amount of monomers, and further based on the total amount of monomers excluding the monomer (a), 60 to 90% by mole of vinylidene fluoride unit, 0 to 30% by mole of tetrafluoroethylene unit and 1 to 10% by mole of hexafluoroethylene unit, (V-5) a polymer comprising 0.5 to 30% by mole of the fluorine-containing ethylenic monomer (a) having functional group based on the total amount of monomers, and further based on the total amount of monomers excluding the monomer (a), 15 to 60% by mole of vinylidene fluoride unit, 35 to 80% by mole of tetrafluoroethylene unit and 5 to 30% by mole of hexafluoropropylene unit, and the like.

Further example of the polymer (VI) is;

a copolymer comprising 0.5 to 30% by mole of the fluorine-containing ethylenic monomer (a) having functional group based on the total amount of monomers, and further based on the total amount of monomers excluding the monomer (a), 75 to 95% by mole of tetrafluoroethylene unit and 5 to 25% by mole of at least one monomer unit selected from the units represented by the above-mentioned formula (2).

The above-mentioned fluorine-containing ethylenic polymers having functional group can be prepared by copolymerizing the fluorine-containing ethylenic monomer (a) having functional group and the fluorine-containing ethylenic monomer (b) having no functional group through known polymerization methods. Among them, radical copolymerization method is mainly used. Namely means for initiating the polymerization is not particularly limited if the polymerization advances radically. For example, the polymerization is initiated by an organic or inorganic radical polymerization initiator, heat, light, ionizing radiation, etc. The polymerization can be carried out by solution polymerization, bulk polymerization, suspension polymerization, emulsion polymerization, or the like. A molecular weight of the polymer is regulated by a concentration of the monomers used in the polymerization, a concentration of the initiator, a concentration of a chain transfer agent and polymerization temperature. Amounts of components of the prepared copolymer can be regulated by amounts of monomers used.

The fluorine-containing ethylenic polymer having functional group and explained above can be made into various forms as a material to be applied to a substrate. Represented examples of its application are a coating material or a material in the form of film. The polymer may be formed into a molded article.

In the present invention, the above-mentioned fluorine-containing ethylenic polymer having functional group can be applied to a substrate in the form of a coating to give a heat resistant composite material for prevention of scattering.

In the present invention, in case of use in the form of a coating, the polymer is capable of being in the form of aqueous dispersion, organic solvent dispersion, powder (including granulate), organosol or an aqueous emulsion of organosol. Among them, from environmental and safety points of view, it is preferable to apply in the form of an aqueous dispersion or powder (powder coating).

The coating may be applied so that excellent adhesive property of the fluorine-containing ethylenic polymer having functional group to the substrate is exhibited. The coating may be applied in one layer or as a primer.

In the present invention, the aqueous dispersion for fluorine-containing coating composition is prepared by dispersing, in water, particles of the above-mentioned fluorine-containing ethylenic polymer having functional group. By introducing a functional group in the fluorine-containing polymer, dispersion stability of fine particles in the aqueous dispersion is enhanced and a coating composition having good storage stability can be obtained, and further leveling property and transparency of a coating film are enhanced.

As the fluorine-containing ethylenic polymer having functional group, from the viewpoint of having non-sticking property and friction resistance in addition to heat resistance, the reactive PTFE (I) is preferred, and from the viewpoint of having non-sticking property and transparency, the reactive PFA or reactive FEP (II) is preferred.

The above-mentioned aqueous dispersion is preferably in a state of 0.01 to 1.0 $\mu$m fine particles of the polymer being dispersed in water. A surfactant may be blended in the aqueous dispersion for the purpose of dispersion stability. Also to the aqueous dispersion can be added additives to be used usually such as pigment, surfactant, defoaming agent, viscosity control agent and leveling agent in amounts not lowering remarkably heat resistance, chemical resistance, non-sticking property and friction resistance.

The aqueous dispersion for fluorine-containing coating composition can be prepared through various methods. Examples of the method are, for instance, a method wherein a powder of the fluorine-containing polymer having functional group and prepared by suspension polymerization is finely pulverized and then the pulverized powder is dispersed homogeneously into an aqueous dispersion medium with a surfactant, a method wherein a fluorine-containing aqueous dispersion is prepared at the same time as emulsion polymerization and further a surfactant and additives are added as case demands, and the like methods. From the viewpoint of productivity and quality (for making particle size smaller and more uniform), a method of preparing an aqueous dispersion directly by emulsion polymerization is preferred.

A concentration of the polymer in the aqueous dispersion varies depending on intended coating thickness, concentration and viscosity of a coating composition, coating method, etc., and is usually selected in the range of from about 5% by weight to about 70% by weight.

The coating method is not particularly limited. The coating may be carried out by brush coating, spray coating, roll coating or the like, followed by drying and then sintering at a temperature of not less than the melting point of the polymer and not more than its decomposition temperature depending on kind of the polymer.

The coating thickness may be selected depending on application, purpose, substrate, etc. For example, the coating thickness is from about 5 $\mu$m to about 200 $\mu$m, preferably from 10 to 100 $\mu$m.

The powder coating composition of the present invention comprises a powder of the above-mentioned fluorine-containing ethylenic polymer having functional group.

Further from the viewpoint of having chemical resistance, corrosion resistance and non-sticking property in addition to heat resistance, the reactive PFA or reactive FEP (II) is preferred, and from the viewpoint of having stain-proofing property, processability and transparency, the reactive ETFE (III) is preferred.

As the fluorine-containing powder coating composition, there can be used preferably one in the form of powder or in the granular form having a particle size of 10 to 1,000 µm and an apparent density of 0.3 to 1.2 g/cc.

To the fluorine-containing powder coating composition can be added optionally additives in an amount not lowering remarkably characteristics such as heat resistance of the fluorine-containing resin. Examples of the additives are, for instance, pigments such as carbon powder, titanium oxide and cobalt oxide; reinforcing agents such as glass fiber powder, carbon fiber powder and mica; amine anti-oxidant; organic sulfur compound; organotin anti-oxidant; phenolic anti-oxidant; thermal stabilizer such as metal soap; leveling agent; anti-static agent; and the like.

The fluorine-containing powder coating composition and the additives may be admixed in the form of powder (dry method) or in the form of slurry (wet method), and the mixing in the form of powder is preferred. As the mixing equipment, there can be used a conventional mixer or pulverizer, for example, a sand mill, V blender, ribbon blender or the like.

The fluorine-containing powder coating composition is generally coated by electrostatic spray coating, fluid-bed dip coating, rotolining, etc., and then sintered at a temperature of not less than the melting point of the polymer and not more than its decomposition temperature depending on kind of the polymer, and thus a good coating film can be formed.

In general in case of electrostatic powder spray coating, a coating film having a thickness of 10 to 200 µm is formed.

Further the fluorine-containing ethylenic polymer having functional group which is used for a fluorine-containing coating material can be also used, by utilizing its adhesive property, as a primer layer for a fluorine-containing coating composition which has good heat resistance at the time when applying a fluorine-containing resin having no functional group on surfaces of substrates such as metal and glass. The obtained heat resistant scattering-preventing composite material is one comprising a primer layer of a fluorine-containing ethylenic polymer having functional group on a substrate and a top layer of a fluorine-containing polymer having no functional group. It is a matter of course that a fluorine-containing ethylenic polymer having functional group may be used as a top coat layer.

The primer for a fluorine-containing coating composition comprises the above-mentioned fluorine-containing ethylenic polymer having functional group.

As the primer, the same fluorine-containing polymer as mentioned above can be used. The primer is selected optionally depending on kind of a substrate surface, kind of the fluorine-containing polymer to be applied through the primer (kind of a top coat), etc. It is preferable in general that the primer for a fluorine-containing coating composition is one which has the same structure as the fluorine-containing polymer to be applied thereon and contains a functional group.

That combination of the primer and top coat assures good compatibility between the fluorine-containing polymer to be used as the primer and the fluorine-containing polymer to be applied thereon, and can give not only good adhesion to the substrate surface but also good intercoat adhesive strength between the primer layer and the top coat layer. Also even in case of the use at high temperature, unlike the case where the primer mixed with other resin component is used, intercoat adhesion failure to be caused due to a difference in thermal shrinkage between the polymers, cracking, pin hole, etc. are hard to arise. Further since the whole coating film comprises the fluorine-containing polymer, it can be used sufficiently for applications requiring transparency and vivid coloring. Still further excellent heat resistance, chemical resistance, non-sticking property and friction resistance can be exhibited more effectively because a layer of fluorine-containing polymer having no functional group is formed on the outermost surface of the coating film.

Examples of the fluorine-containing polymer having no functional group and used for a top coat layer are PTFE, PFA, FEP, ETFE, PVdF and VdF copolymers.

As the primer for fluorine-containing coating composition, there can be used the above-mentioned fluorine-containing ethylenic polymer having functional group. In case where a substrate is coated with PTFE, it is preferable to use the primer selected from the reactive PTFE (I), reactive PFA and reactive FEP (II). It is particularly preferable to use, as the primer, thermo-melting reactive PFA or FEP (II) since it is possible to thermo-melt and strongly adhere to a substrate surface by sintering. In case where a substrate is coated with PFA or FEP, it is preferable to use, as the primer, reactive PFA or FEP (II). Further in case where a substrate is coated with ETFE, it is particularly preferable to use, as the primer, reactive ETFE (III) from the viewpoint of adhesion and transparency.

As a coating method using a primer layer, there can be used preferably a method of coating a fluorine-containing polymer, which mainly comprises the following three steps;

(First step) a step for applying, to a substrate surface, the primer for fluorine-containing coating composition comprising the above-mentioned fluorine-containing polymer having functional group, (Second step) a step for applying a fluorine-containing coating composition comprising a fluorine-containing polymer having functional group or no functional group, to the primer layer formed in the above first step, and (Third step) a step for sintering the laminated article obtained in the above first and second steps.

Further the primer layer applied in the above first step may be set by drying at 80° to 150° C. for about 5 minutes to about 30 minutes prior to the second step (2 coats/1 bake) or may be sintered, for example, at a temperature of not less than the melting temperature thereof prior to the second step (2 coats/2 bakes).

The method for applying the primer in the first step is optionally selected depending on the form of the primer. For example, in case where the fluorine-containing primer is in the form of aqueous dispersion, spray coating, spin coating, brush coating and dip coating methods are used. Also in case of the form of powder coating composition, coating methods such as electrostatic coating, fluid-bed dip coating and rotolining are employed.

A thickness of the primer layer may vary depending on purpose, application, kind of a substrate surface and coating method. The thickness is from 1 to 50 µm, preferably from 2 to 20 µm. Since the thickness of the primer is in general thin as mentioned above, it is preferable to coat the primer in the form of aqueous dispersion by spray coating, etc.

The method for applying the coating composition comprising a fluorine-containing polymer having functional group or no functional group to the primer layer in the second step is optionally selected depending on kind of the fluorine-containing polymer, form of the coating, purpose and application. For example, in case of an aqueous dispersion and organic solvent dispersion, usually spray coating, brush coating, roll coating and spin coating are carried out. In case of a powder coating composition, electrostatic coating, fluid-bed dip coating or rotolining are carried out.

A coating thickness of the fluorine-containing polymer in this step varies entirely depending on application of the heat resistant scattering-preventing composite material and coating method. The thickness is in general from 5 to 50 μm, preferably from about 10 μm to about 30 μm in case of spray coating. When a thick coating film is desired by using a powder coating composition, it is possible to apply at a thickness of 20 to 2,000 μm in case of electrostatic coating.

Sintering conditions in the third step are optionally selected depending on kinds of fluorine-containing polymers (component, melting point, etc.) of the primer layer and the top layer thereon. The sintering is carried out in general at a temperature of not less than the melting point of the both fluorine-containing polymers. A sintering time varies depending on the sintering temperature, and is from five minutes to three hours, preferably from about 10 minutes to about 30 minutes. For example, when coating with PTFE, PFA and FEP, sintering is carried out at 320° to 400° C., preferably 350° to 400° C.

Then technique for applying the above-mentioned fluorine-containing ethylenic polymer having functional group in the form of film to produce a heat resistant scattering-preventing composite material is explained.

Merits of applying in the form of film are as follows.

① A film comprising a fluorine-containing ethylenic polymer having functional group is advantageous from the viewpoint of processing since an applicator necessary for hot melt adhesive is not required, and the film can be adhered by thermocompression bonding while being put on a substrate or inserted between substrates.

② Further since a uniform adhesive layer is formed on the whole surface of substrate, a film free from nonuniform adhesion and having uniform adhesive strength can be obtained, and thus can be also applied to a substrate having poor or no compatibility therewith.

③ Further the film can be cut into various shapes, and thus is advantageous from the viewpoint of a small loss in processing work, good working environment and cost.

The preferred fluorine-containing polymer film of the present invention is one which is produced by molding the above-mentioned fluorine-containing ethylenic polymer having functional group. The film can be adhered to various substrates without surface treating and using usual adhesives, thereby giving excellent characteristics of a fluorine-containing polymer to the substrates.

Though it is possible to produce adhesive films from the above-mentioned fluorine-containing polymers having functional group by using various adhesives depending on purpose of the heat resistant scattering-preventing composite material, film production process and adhering method, the above-mentioned copolymer (II) (reactive PFA or reactive FEP) or copolymer (III) (reactive ETFE) is preferred since the adhesive film itself has, in addition to heat resistance, chemical resistance, non-sticking property and mechanical properties; efficient film molding represented by melt-molding can be carried out; the film has good moldability; making the film thin and uniform is possible; and it is possible to melt the film by various thermocompression bonding methods to adhere strongly and beautifully to various substrates. Particularly preferred functional group is hydroxyl from the viewpoint of heat resistance.

A thickness of the fluorine-containing polymer film is selected depending on application of the heat resistant scattering-preventing composite material and is not limited particularly. The thickness is from 10 to 3,000 μm, preferably from 20 to 500 μm, particularly preferably from 40 to 300 μm.

In case of too thin films, special production method is required; it is difficult to handle the film at the time of adhering; wrinkling, breaking and poor appearance occur easily; and there is a case where adhesive strength, mechanical strength, chemical resistance and weather resistance become insufficient. Too thick film is disadvantageous from the viewpoint of cost and workability at the time of bonding to one unit.

In the present invention, the fluorine-containing polymer film may be used alone or can be used in the laminated film comprising the film (adhesive layer) of fluorine-containing ethylenic polymer having functional group and the film (surface layer) of fluorine-containing ethylenic polymer having functional group or no functional group.

Namely one surface of the film is a layer comprising a fluorine-containing ethylenic polymer having functional group and has adhesive property to a substrate, and another surface of the film is a layer comprising usual fluorine-containing polymer. By bringing the surface of the fluorine-containing ethylenic polymer having functional group into contact to the substrate and adhering it to the substrate by thermocompression bonding, etc., excellent characteristics of the fluorine-containing polymer such as heat resistance, chemical resistance, non-sticking property, stain-proofing property, friction resistance, weather resistance and electrical properties (high frequency electrical insulation property) can be given to the composite material.

In the present invention, a thickness of the two-layered laminated film of fluorine-containing polymer is selected depending on application of the heat resistant scattering-preventing composite material, and is not limited particularly. The total thickness of two layers is from 20 to 5,000 μm, preferably from 40 to 1,000 μm, particularly preferably from 100 to 500 μm.

A thickness of each layer which can be used is from 5 to 1,000 μm, preferably from 10 to 500 μm, particularly preferably from 10 to 200 μm of the adhesive layer, and from about 15 μm to about 4,995 μm, preferably from 30 to 990 μm, particularly preferably from 90 to 490 μm of the fluorine-containing polymer layer (surface layer).

The film for the surface layer may be adhered after adhering the film for the adhesive layer to a substrate.

To the film of fluorine-containing polymer having functional group can be optionally incorporated proper additives such as a reinforcing agent, filler, stabilizer, ultraviolet ray absorber, pigment, etc. in an amount not lowering characteristics of the film. Those additives make it possible to improve thermal stability, surface hardness, abrasion resistance, weather resistance and electrostatic charge, etc.

The fluorine-containing polymer film of the present invention can be produced, depending on kind of polymers used and desired shape of the film, by various methods such as thermal melting method, extrusion method, cutting method, solvent-casting method and a method of applying a powder or an aqueous dispersion or organic solvent dispersion to form a continuous coating film.

For example, a polymer which comprises the above-mentioned reactive PTFE and is difficult to be melt-molded can be molded by compression molding, extrusion molding (ram extrusion, paste extrusion, roll press, etc.) or the like. A polymer such as reactive PFA, FEP or ETFE which is melt-moldable is molded by compression molding and extrusion molding, and melt-extrusion molding is particularly preferred from the viewpoint of productivity and product quality.

Bonding of the two films into one laminated film can be carried out by a method of overlapping the respective molded films for adhesive layer and surface layer and then compression-molding; a method of applying one fluorine-containing polymer to a molded film comprising another fluorine-containing polymer; a method of carrying out film molding and bonding of films at the same time through multi-layer co-extrusion molding method, or the like method. Among them, the multi-layer co-extrusion molding method is preferred from the viewpoint of productivity and product quality.

Adhesion of the film of fluorine-containing polymer having functional group to a substrate is achieved through thermal activation by heating, etc. Further thermo-melting adhesion is preferable. Represented examples of the adhering method are heating roller method and heat press method. Also there are other methods such as high-frequency heating, microwave heating, vacuum compression (vacuum press, etc.) and pneumatic press. Those methods can be optionally selected depending on kind and shape of a substrate, condition and kind of film, etc.

Examples of the substrate on which the fluorine-containing polymer having functional group can be adhered, are a metallic substrate, ceramic substrate, synthetic resin substrate, and the like. The composite material of the present invention, the purpose of which is to prevent a broken substrate from scattering, is used for ceramic substrates, and synthetic resin substrates and inorganic non-metal substrates which are easy to be broken.

Examples of the ceramic substrate are, for instance, glass, pottery, porcelain, quartz, etc.

Components of glass are not particularly limited. Examples are silica glass, lead glass, non-alkali glass, alkali glass, etc.

Examples of the synthetic resin substrate are, for instance, an acrylic resin, polycarbonate, heat resistant engineering plastic, etc.

In addition, there are inorganic non-metal substrates of monocrystal silicon, polycrystal silicon, tile, cement, gypsum, concrete, etc.

It is preferable that the form of the substrate is the same as a form of a finished product using the heat resistant scattering-preventing composite material from the viewpoint that there is a case where processability is difficult after a coating film, etc. is formed.

The heat resistant scattering-preventing composite material of the present invention can be made in various forms depending on purpose and application, and from the viewpoint of exhibiting scattering-preventing property effectively, a form of laminated article is preferred. Examples of preferred laminated article are:

① a laminated article comprising two layers of
   (A) a fluorine-containing polymer having functional group and
   (B) a substrate of glass, etc., scattering of which is desired to be prevented, ② a laminated article comprising three layers of
   (B) a substrate of glass, etc., scattering of which is desired to be prevented,
   (A) a fluorine-containing polymer having functional group and
   (B) a substrate of glass, etc., scattering of which is desired to be prevented, wherein the layer (A) is inserted between the two layers (B) (so-called laminated glass).

The composite material of the present invention can be used on various illumination apparatuses, building materials of glass, glass vessels, displaying apparatuses, etc. firstly because a fluorine-containing resin surface has excellent heat resistance, secondarily because a fluorine-containing resin is applied to a substrate with good adhesion and thirdly because the fluorine-containing resin has good transparency, chemical resistance, stain-proofing property and water and oil repellency.

Non-restricted examples of illumination apparatuses, glass and parts thereof, to which the heat resistant scattering-preventing composite material of the present invention can be suitably applied are classified below by fields they belong to and also other effects than scattering-preventing property are mentioned together.

[1] Illumination Apparatuses

① Electric bulb
   Products: Incandescent lamp, fluorescent lamp, fishing light and search light
   Application: Outer surface of bulb
   Substrate: Glass
   Fluorine-containing polymer having functional group: Reactive PFA or FEP
   Form of polymer to be applied: Coating (particularly powder coating composition)
   Effect: Processability, heat resistance, transparency, stain-proofing property and weather resistance In addition to the above-mentioned electric bulbs, there are metal halide bulb, metal vapor discharge lamp, high intensity discharge lamp (HID lamp), red fluorescent lamp, mercury lamp, high pressure sodium lamp, low pressure discharge lamp, high pressure vapor discharge lamp, head lamp for cars, ultraviolet ray lamp for water treatment, stadium bulb, and the like. In these applications, heat resistance and processability which the composite material of the present invention possesses can be used particularly effectively.

② Accessories for electric bulb
   Products: Shade for bulb and cover for bulb
   Application: Surface and outer surface of cover
   Substrate: Glass, polycarbonate and acrylic resin
   Fluorine-containing polymer having functional group: Reactive PFA or FEP, reactive ETFE and functional group-containing polymer having a low melting point (the above-mentioned polymers IV, V and VI)
   Form of polymer to be applied: Coating and film
   Effect: Processability, heat resistance, transparency, stain-proofing property and weather resistance ③ Lamps for cars
   Products: Head light, tail lamp, turn signal, fog lamp, brake lamp and room lamp
   Application: Outer surface of bulb
   Substrate: Glass
   Fluorine-containing polymer having functional group: Reactive PFA or FEP or reactive ETFE
   Form of polymer to be applied: Coating
   Effect: Processability and heat resistance ④ Lamp covers for cars
   Products: Head light, tail lamp, turn signal, fog lamp, brake lamp and room lamp
   Application: Surface of cover
   Substrate: Glass and polycarbonate Fluorine-containing polymer having functional group: Reactive PFA or FEP, reactive ETFE and functional group-containing polymer having a low melting point (the above-mentioned polymers IV, V and VI)

Form of polymer to be applied: Coating and film

Effect: Processability, stain-proofing property and weather resistance

[2] Building Materials

With respect to building materials, particularly non-flammability against fire is desired in addition to heat resistance and scattering preventing property. Since the scattering-preventing composite material of the present invention possesses those characteristics, it can be used effectively for building materials.

① Fire-proof safety glass

Application: Laminated glass (film between the two glasses), lamination of one surface of glass Substrate: Glass Fluorine-containing polymer having functional group: Reactive PFA or FEP, reactive ETFE and functional group-containing polymer having a low melting point (the above-mentioned polymers IV, V and VI)

Form of polymer to be applied: Film

Effect: Non-flammability, heat resistance, processability, stain-proofing property and weather resistance ② Materials for building Products: Window glass and glass curtain wall Application: Laminated glass (film between the two glasses), lamination of one surface of glass Substrate: Glass Fluorine-containing polymer having functional group: Reactive PFA or FEP, reactive ETFE and functional group-containing polymer having a low melting point (the above-mentioned polymers IV, V and VI)

Form of polymer to be applied: Film

Effect: Non-flammability, heat resistance, processability, stain-proofing property and weather resistance ③ Building materials for housing Products: Window glass, roof, sun room and sun terrace Application: Laminated glass (film between the two glasses), lamination of one surface of glass Substrate: Glass Fluorine-containing polymer having functional group: Reactive PFA or FEP, reactive ETFE and functional group-containing polymer having a low melting point (the above-mentioned polymers IV, V and VI)

Form of polymer to be applied: Film

Effect: Non-flammability, heat resistance, processability, stain-proofing property and weather resistance ④ Greenhouse Application: Laminated glass (film between the two glasses), lamination of one surface of glass Substrate: Glass Fluorine-containing polymer having functional group: Reactive PFA or FEP, reactive ETFE and functional group-containing polymer having a low melting point (the above-mentioned polymers IV, V and VI)

Form of polymer to be applied: Film

Effect: Non-flammability, heat resistance, processability, stain-proofing property and weather resistance ⑤ Display window Application: Laminated glass (film between the two glasses), lamination of one surface of glass Substrate: Glass Fluorine-containing polymer having functional group: Reactive PFA or FEP, reactive ETFE and functional group-containing polymer having a low melting point (the above-mentioned polymers IV, V and VI)

Form of polymer to be applied: Film

Effect: Non-flammability, heat resistance, processability, stain-proofing property and weather resistance ⑥ Leisure facilities Products: Dome, sun room, dome-like ceiling, glass for collecting light Application: Laminated glass (film between the two glasses), lamination of one surface of glass Substrate: Glass Fluorine-containing polymer having functional group: Reactive PFA or FEP, reactive ETFE and functional group-containing polymer having a low melting point (the above-mentioned polymers IV, V and VI)

Form of polymer to be applied: Film

Effect: Non-flammability, heat resistance, processability, stain-proofing property and weather resistance ⑦ Public facilities such as aquarium, museum and art gallery Products: Large size water tank, glass for collecting light, sun roof, dome and display case Application: Laminated glass (film between the two glasses), lamination of one surface of glass Substrate: Glass Fluorine-containing polymer having functional group: Reactive PFA or FEP, reactive ETFE and functional group-containing polymer having a low melting point (the above-mentioned polymers IV, V and VI)

Form of polymer to be applied: Film

Effect: Non-flammability, heat resistance, processability, stain-proofing property and weather resistance ⑧ Exterior Products: Carport and sun roof Application: Laminated glass (film between the two glasses), lamination of one surface of glass Substrate: Acrylic resin, polycarbonate and glass Fluorine-containing polymer having functional group: Reactive PFA or FEP, reactive ETFE and functional group-containing polymer having a low melting point (the above-mentioned polymers IV, V and VI)

Form of polymer to be applied: Film

Effect: Non-flammability, heat resistance, processability, stain-proofing property and weather resistance ⑨ Large size ceramic plate, tile, building materials made of gypsum and cement plate Application: Lamination of one surface, intermediate film between two substrates Substrate: Ceramic, tile, cement and gypsum Fluorine-containing polymer having functional group: Reactive PFA or FEP, reactive ETFE and functional group-containing polymer having a low melting point (the above-mentioned polymers IV, V and VI)

Form of polymer to be applied: Film

Effect: Non-flammability, heat resistance, processability, stain-proofing property and weather resistance

[3] Displaying Apparatus

① Liquid crystal display panel
Application: Surface of display panel
Substrate: Glass and acrylic resin
Fluorine-containing polymer having functional group: Reactive PFA or FEP, reactive ETFE and functional group-containing polymer having a low melting point (the above-mentioned polymers IV, V and VI)
Form of polymer to be applied: Film and coating
Effect: Processability, transparency and stain-proofing property ② Cathode ray tube
Application: Surface of display panel
Substrate: Glass
Fluorine-containing polymer having functional group: Reactive PFA or FEP, reactive ETFE and functional group-containing polymer having a low melting point (the above-mentioned polymers IV, V and VI)
Form of polymer to be applied: Film and coating
Effect: Processability, transparency and stain-proofing property

[4] Domestic Appliances (Particularly Cooking Apparatuses)

① Doors of microwave range and microwave range with oven
Application: Laminated glass of door window (film between the two glasses)
Substrate: Glass
Fluorine-containing polymer having functional group: Reactive PFA or FEP
Form of polymer to be applied: Film
Effect: Heat resistance, resistance to microwave and processability ② Grill and gas range with grill
Application: Laminated glass of door window (film between the two glasses)
Substrate: Glass
Fluorine-containing polymer having functional group: Reactive PFA or FEP
Form of polymer to be applied: Film
Effect: Heat resistance and processability ③ Door of oven toaster
Application: Laminated glass of door window (film between the two glasses)
Substrate: Glass
Fluorine-containing polymer having functional group: Reactive PFA or FEP
Form of polymer to be applied: Film
Effect: Heat resistance and processability ④ Microwave range and lamps in microwave range
Application: Outer surface of lamp
Substrate: Glass
Fluorine-containing polymer having functional group: Reactive PFA or FEP
Form of polymer to be applied: Coating (particularly powder coating composition)
Effect: Heat resistance and processability

[5] Others

① Glass vessels
Product: Bottle for chemicals
Application: Outer surface and inner surface
Substrate: Glass
Fluorine-containing polymer having functional group: Reactive PFA or FEP, reactive ETFE and functional group-containing polymer having a low melting point (the above-mentioned polymers IV, V and VI)
Form of polymer to be applied: Film and coating
Effect: Processability, transparency, non-sticking property, water-repellency and chemical resistance In addition, the heat resistant scattering-preventing composite material of the present invention can be used effectively for lens, mirror, display panel for escape guiding, earthenware and porcelain products, etc.

EXAMPLE

The heat resistant scattering-preventing composite materials of the present invention are then explained by means of preparation examples and examples, but the present invention is not limited to those examples.

Preparation Example 1
(Synthesis of PFA Having Hydroxyl)

A 6-liter glass-lined autoclave equipped with a stirrer, valve, pressure gauge and thermometer was charged with 1,500 ml of pure water. After replacing with nitrogen gas sufficiently, the autoclave was evacuated and charged with 1,500 g of 1,2-dichloro-1,1,2,2-tetrafluoroethane (R-114).

Then 5.0 g of perfluoro-(1,1,9,9-tetrahydro-2,5-bistrifluoromethyl-3,6-dioxa-8-nonenol) represented by the formula (7):

(7)

130 g of perfluoro(propyl vinyl ether) (PPVE) and 180 g of methanol were fed into the autoclave with pressurized nitrogen gas, and a temperature inside the system was maintained at 35° C.

Pressurized tetrafluoroethylene (TFE) gas was introduced into the autoclave with stirring so that the inside pressure of the autoclave became 8.0 kgf/cm$^2$G. Then 0.5 g of a 50% methanol solution of di-n-propyl peroxydicarbonate was fed with pressurized nitrogen to initiate the reaction.

Since the pressure lowered with the advance of the polymerization reaction, at the time when the pressure lowered down to 7.5 kgf/cm$^2$G, it was increased again to 8.0 kgf/cm$^2$, and the decreasing and increasing of the pressure were repeated.

With continuing supply of tetrafluoroethylene, every time when about 60 g of tetrafluoroethylene gas was consumed after starting of the polymerization, 2.5 g of the fluorine-containing ethylenic monomer having hydroxyl (compound represented by the formula (7)) was introduced nine times (22.5 g in total) under pressure to continue the polymerization. When about 600 g of tetrafluoroethylene was consumed after starting of the polymerization, the supplying thereof was terminated. The autoclave was cooled and the un-reacted monomer and R-114 were released.

The obtained copolymer was washed with water, rinsed with methanol and then vacuum-dried to give 710 g of a white solid. The composition of the obtained copolymer was TFE/PPVE/(Fluorine-containing ethylenic monomer having hydroxyl and represented by the formula (7))=97.0/2.0/1.0% by mole according to $^{19}$F-NMR and IR analyses. In infrared spectrum, characteristic absorption of —OH was observed at 3,620 to 3,400 cm$^{-1}$. According to DSC analysis, Tm was 305° C., and according to DTGA analysis, 1% thermal decomposition temperature Td was 375° C. A melt flow rate measured under conditions of preheating at 372° C. for five minutes at a load of 7 kgf/cm$^2$ by using Koka-type flow tester and nozzles of 2 mm diameter×8 mm length was 32 g/10 min.

Preparation Example 2
(Synthesis of PFA Having Hydroxyl)

A 6-liter glass-lined autoclave equipped with a stirrer, valve, pressure gauge and thermometer was charged with 1,500 ml of pure water. After replacing with nitrogen gas sufficiently, the autoclave was evacuated and charged with 1,500 g of 1,2-dichloro-1,1,2,2-tetrafluoroethane (R-114).

Then the reaction was initiated in the same manner as in Preparation Example 1 except that 2.5 g of perfluoro-(1,1,9,9-tetrahydro-2,5-bistrifluoromethyl-3,6-dioxa-8-nonenol) (formula (7)), 132 g of perfluoro(propyl vinyl ether) (PPVE) and 230 g of methanol were used. A temperature inside the system was maintained at 35° C.

Pressurized tetrafluoroethylene (TFE) gas was introduced into the autoclave with stirring so that the inside pressure of the autoclave became 8.0 kgf/cm$^2$G. Then 0.5 g of a 50% methanol solution of di-n-propyl peroxydicarbonate was added with pressurized nitrogen gas to initiate the reaction.

Since the pressure lowered with the advance of the polymerization reaction, it was increased again to 8.0 kgf/cm$^2$ by feeding tetrafluoroethylene gas at the time when it lowered to 7.5 kgf/cm$^2$G. Thus the decreasing and increasing of the pressure was repeated.

Further 680 g of a white solid copolymer was obtained in the same manner as in Preparation Example 1 except that every time when about 60 g of tetrafluoroethylene gas was consumed after starting of the polymerization, 1.23 g of the above-mentioned fluorine-containing ethylenic monomer having hydroxyl (compound represented by the formula (7)) was introduced under pressure nine times (11.10 g in total). Components and their amounts of the obtained copolymer which were determined through $^{19}$F-NMR and IR analyses were TFE/PPVE/(Fluorine-containing ethylenic monomer having hydroxyl and represented by the formula (7))=97.6/2.0/0.4% by mole. In infrared spectrum, characteristic absorption of —OH was observed at 3,620 to 3,400 cm$^{-1}$. According to DSC analysis, Tm was 310° C., and according to DTGA analysis, a decomposition starting temperature was 368° C. and 1% thermal decomposition temperature Td was 375° C. A melt flow rate measured under conditions of preheating at 372° C. for five minutes at a load of 7 kgf/cm$^2$ by using Koka-type flow tester and nozzles of 2 mm diameter×8 mm length was 42 g/10 min.

Preparation Example 3
(Synthesis of PFA Having Hydroxyl)

A 6-liter glass-lined autoclave equipped with a stirrer, valve, pressure gauge and thermometer was charged with 1,500 ml of pure water. After replacing with nitrogen gas sufficiently, the autoclave was evacuated and charged with 1,500 g of 1,2-dichloro-1,1,2,2-tetrafluoroethane (R-114).

Then 10.2 g of perfluoro-(1,1,9,9-tetrahydro-2,5-bistrifluoromethyl-3,6-dioxa-8-nonenol) (formula (7)), 130 g of perfluoro(propyl vinyl ether) (PPVE) and 180 g of methanol were added with pressurized nitrogen gas. A temperature inside the system was maintained at 35° C.

Pressurized tetrafluoroethylene (TFE) gas was introduced into the autoclave with stirring so that the inside pressure of the autoclave became 8.0 kgf/cm$^2$G. Then 0.5 g of a 50% methanol solution of di-n-propyl peroxydicarbonate was added with pressurized nitrogen gas to initiate the reaction.

Since the pressure lowered with the advance of the polymerization reaction, it was increased again to 8.0 kgf/cm$^2$ by feeding tetrafluoroethylene gas at the time when it lowered to 7.5 kgf/cm$^2$G. Thus the decreasing and increasing of the pressure was repeated.

With continuing supply of tetrafluoroethylene, every time when about 60 g of tetrafluoroethylene gas was consumed after starting of the polymerization, 5.14 g of the fluorine-containing ethylenic monomer having hydroxyl (compound represented by the formula (7)) was introduced nine times (46.3 g in total) under pressure to continue the polymerization. When about 600 g of tetrafluoroethylene was consumed after starting of the polymerization, the supplying thereof was terminated. The autoclave was cooled and the un-reacted monomer and R-114 were released.

The obtained polymer was washed with water, rinsed with methanol and then vacuum-dried to give 721 g of a white solid (powder). The composition of the obtained copolymer was TFE/PPVE/(Fluorine-containing ethylenic monomer having hydroxyl and represented by the formula (7))=97.6/2.0/1.8% by mole according to $^{19}$F-NMR and IR analyses. In infrared spectrum, characteristic absorption of —OH was observed at 3,620 to 3,400 cm$^{-1}$. According to DSC analysis, Tm was 311° C., and according to DTGA analysis, a decomposition starting temperature was 368° C. and 1% thermal decomposition temperature Td was 362° C. A melt flow rate measured under conditions of preheating at 372° C. for five minutes at a load of 7 kgf/cm$^2$ by using Koka-type flow tester and nozzles of 2 mm diameter×8 mm length was 85 g/10 min.

Preparation Example 4
(Synthesis of PFA Having No Functional Group)

Synthesis was carried out in the same manner as in Preparation Example 1 except that perfluoro-(1,1,9,9-tetrahydro-2,5-bistrifluoromethyl-3,6-dioxa-8-nonenol) (compound represented by the formula (7)) was not used and 240 g of methanol was used, and thus 597 g of PFA having no functional group was obtained.

The obtained PFA was analyzed in the same manner as in Preparation Example 1 and the results were as follows.

TFE/PPVE=98.2/1.8% by mole
$T_m$=310° C.
Td=469° C. (1% weight reduction)
Melt flow rate: 24 g/10 min Preparation Example 5
(Preparation of PFA Powder Coating Composition Having Hydroxyl)

The PFA powder having hydroxyl (apparent specific gravity: 0.5, true specific gravity: 2.1, average particle size: 600 μm) and prepared in Preparation Example 1 was compressed into a sheet of 60 mm wide×5 mm thick by a Roller Compactor (Model BCS-25 available from Shinto Kogyo Kabushiki Kaisha), and then crushed into about 10 mm diameter by a crusher and further finely pulverized at room temperature at 11,000 rpm by a pulverizer (Cosmomizer Model N-1 available from Kabushiki Kaisha Nara Kikai Seisakusho). Subsequently the coarse powder particles of not less than 170 mesh (88 μm of sieve opening) were separated by a classifier (Hibolder Model 300SD available from Shi-Tokyo Kikai Kabushiki Kaisha) to give a PFA powder coating composition having hydroxyl. An apparent density of the powder was 0.7 g/ml, and an average particle size thereof was 20 µm.

Preparation Example 6
(Preparation of PFA Powder Coating Composition Having No Functional Group)

A PFA powder coating composition was prepared in the same manner as in Preparation Example 5 except that the PFA powder having no functional group (apparent specific gravity: 0.6, true specific gravity: 2.1, average particle size: 400 µm) and prepared in Preparation Example 4 was used instead of the PFA powder having hydroxyl and prepared in Preparation Example 1. An apparent density of the powder was 0.83 g/ml, and an average particle size thereof was 26 µm.

Preparation Example 7
(Synthesis of Fluorine-Containing Polymer Prepared by Using a Non-Fluorine-Containing Monomer Having Functional Group)

A 1-liter stainless steel autoclave equipped with a stirrer, valve, pressure gauge and thermometer was charged with 250 g of butyl acetate, 36.4 g of vinyl pivalate (VPi) and as a non-fluorine-containing monomer having hydroxyl, 32.5 g of 4-hydroxybutyl vinyl ether (HBVE) and 4.0 g of isopropoxycarbonyl peroxide. After cooling to 0° C. with ice and replacing with nitrogen gas sufficiently, the autoclave was evacuated and charged with 47.5 g of isobutylene (IB) and 142 g of tetrafluoroethylene (TFE).

The autoclave was heated to 40° C. and reaction was carried out for 30 hours with stirring. At the time when the inside pressure of the reaction vessel was lowered to not more than 2.0 kg/cm², the reaction was terminated. The autoclave was cooled and un-reacted gas monomer was released, and thus a butyl acetate solution of a fluorine-containing polymer was obtained. A polymer concentration was 45%.

A fluorine-containing polymer was separated from the obtained butyl acetate solution of a fluorine-containing polymer through re-precipitation method, followed by sufficiently reducing pressure and drying, thus being separated in the form of white solid. According to $^1$H-NMR and $^{19}$F-NMR elementary analyses, the obtained fluorine-containing polymer was a copolymer of TFE/IB/VPi/HBVE=44/34/15/7% by mole.

Preparation Example 8
(Production of Film of PFA Having Hydroxyl)

A metal die of 100 mm diameter was charged with 8.0 g of the white solid obtained in Preparation Example 1 and set on a press machine of 350° C., followed by preheating for 30 minutes and then compression-molding at 70 kg/cm² for one minute. Thus a 0.5 mm thick film was obtained.

Preparation Example 9
(Production of Film of PFA Having Hydroxyl)

The same procedures as in Preparation Example 8 were repeated except that the white solid obtained in Preparation Example 2 was used, to give a 0.5 mm thick film.

Preparation Example 10
(Production of Film of PFA Having No Functional Group)

The same procedures as in Preparation Example 8 were repeated except that the white solid obtained in Preparation Example 4 was used, to give a 0.5 mm thick film.

Preparation Example 11
(Production of Film of PFA Having Hydroxyl by Extrusion)

The white solid obtained in Preparation Example 1 was extruded at 350° to 370° C. by using a two screw extruder (LABOPLASTOMIL available from Toyo Seiki Kabushiki Kaisha) to give pellets. The pellets were extruded at 360° to 380° C. at a roll temperature of 120° C. by using a single screw extruder (LABOPLASTOMIL available from Toyo Seiki Kabushiki Kaisha) to give a film of 10 cm wide×100 to 150 µm thick.

Preparation Example 12
(Production of Film of PFA Having Hydroxyl by Extrusion)

The same procedures as in Preparation Example 11 were repeated except that the white solid obtained in Preparation Example 3 was used instead of the white solid obtained in Preparation Example 1, to give pellets. Further extrusion was carried out in the same manner as in Preparation Example 11 to give a film of 10 cm wide×100 to 150 µm thick.

Preparation Example 13
(Production of Film of PFA Having No Functional Group by Extrusion)

The same procedures as in Preparation Example 11 were repeated except that the white solid obtained in Preparation Example 4 was used, to give pellets. Further extrusion was carried out in the same manner as in Preparation Example 11 to give a film of 10 cm wide×100 to 150 µm thick.

Preparation Example 14
(Production of Laminated Film of PFA Having Hydroxyl and PTFE)

The film of PFA having hydroxyl and obtained in Preparation Example 11 and a 0.5 mm thick PTFE film were overlapped and compression-molded in the same manner as in Preparation Example 8.

The two layers were adhered strongly.

Figure 2:
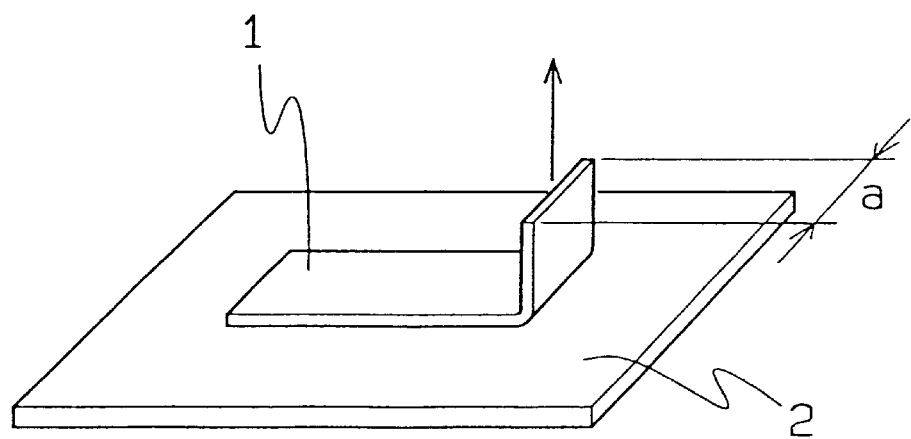
FIG. 2 is a diagrammatic perspective view of a test sample used to measure adhesive strength in Example 1 of the present invention.

Example 1
(Evaluation of Adhesive Property of PFA Powder Coating Composition Having Hydroxyl)
(1) Production of Press Sheet for Adhesion Test About 4 g of the PFA powder coating composition having hydroxyl and prepared in Preparation Example 5 was put in a cylindrical metal mold of 60 mm diameter and compression-molded at room temperature at a pressure of 300 kgf/cm² with a press machine to give a disc-like cold press sheet (hereinafter also referred to as "PFA sheet").
(2) Pre-Treatment of Substrate A Pyrex glass plate of 70×70×2 (mm) was degreased with acetone.
(3) Production of Adhered Sample The PFA sheet obtained in (1) above was placed on the glass plate ((2) above) and put in a hot air dryer to heat and melt at 330° C. for 10 minutes. Thus a sample produced by adhering the PFA sheet of about 450 µm thick to the glass plate was obtained. FIG. 1 shows a diagrammatic plan view of the adhered plate comprising the PFA sheet 1 and the glass plate 2.
(4) Measurement of Adhesive Strength As shown in FIG. 1, the PFA sheet 1 of the adhered sample obtained in (3) above was cut with a cutter at intervals of a width a (10 mm) and one end of each strip-like sheet 1 was folded up, thus giving a test sample for measuring adhesive strength. FIG. 2 shows a diagrammatic perspective view of the test sample for measuring adhesive strength. As shown in FIG. 2, the sheet 1 was pulled up at an angle of 90° to the glass plate 2 to measure peeling strength. The adhesive strength was measured at room temperature at a cross head speed of 50 mm/min with TENSILON Universal Tester (available from Orientec Corporation). An adhesive strength was 2.5 kgf/cm as an average value of peel by area method.

Comparative Example 1
(Evaluation of Adhesive Property of PFA Powder Coating Composition Having No Functional Group)

Production of a press sheet for adhesion test, pre-treatment of a substrate and production of an adhered sample were carried out in the same manner as in Example 1 except that the powder coating composition of PFA having no functional group and prepared in Preparation Example 6 was used instead of the powder coating composition of PFA having hydroxyl and prepared in Preparation Example 5. Then adhesive strength was measured.

Adhesive strength of the powder coating composition of PFA having no functional group was 0.2 kgf/cm.

Example 2
(Electrostatic Coating of Powder Coating Composition of PFA Having Hydroxyl)

(1) Pre-Treatment of Substrate

After a glass plate of 150×70×2 (mm) was washed with acetone, a 0.5% methanol solution of anti-static agent (ELEGAN 264A available from NOF Corporation) was coated on the plate and then air-dried.

(2) Electrostatic Coating

Electrostatic coating of the powder coating composition of PFA having hydroxyl and prepared in Preparation Example 5 was carried out on the glass plate obtained in above (1) at room temperature at a voltage of 40 kV with an electrostatic coating machine (Model GX3300 available from Iwata Toso Kabushiki Kaisha). The coated plate was sintered at 330° C. for 15 minutes with a hot air dryer to give a coating film.

The coating film was a continuous uniform transparent film and was adhered strongly to the glass plate.

Adhesion test was carried out in the manner mentioned below.

(Cross-Cut Adhesion Test)

According to JIS K 5400 1990, 8. 5. 2, a coated surface was cross-cut to give 100 squares, and an adhesive tape (available from Nichiban Kabushiki Kaisha) was adhered to the cross-cut surface sufficiently. Then immediately the tape was torn off. This was repeated 10 times with new adhesive tapes to check to see how many squares remained among 100 squares.

As a result, it was seen that all of 100 squares (100/100) remained and sufficient adhesion was exhibited.

Comparative Example 2

Electrostatic coating was carried out on a glass plate in the same manner as in Example 2 except that the PFA powder coating composition having no functional group and prepared in Preparation Example 6 was used instead of the PFA powder coating composition having hydroxyl and prepared in Preparation Example 5, and then cross-cut adhesion test was carried out.

As a result, all of 100 squares were completely separated by peeling with an adhesive tape (0/100).

Examples 3 to 4
(Adhesion Test of PFA Film Having Hydroxyl to Glass)

Adhesion test of PFA having hydroxyl to Pyrex glass plate of 30×20×5 mm was carried out in the manner mentioned below.

Further hot water resistance test and methanol dipping test of the laminated article after the adhesion were carried out. The results are shown in Table 1.

(Production of Test Piece for Tensile Shear Test)

Figure 3:
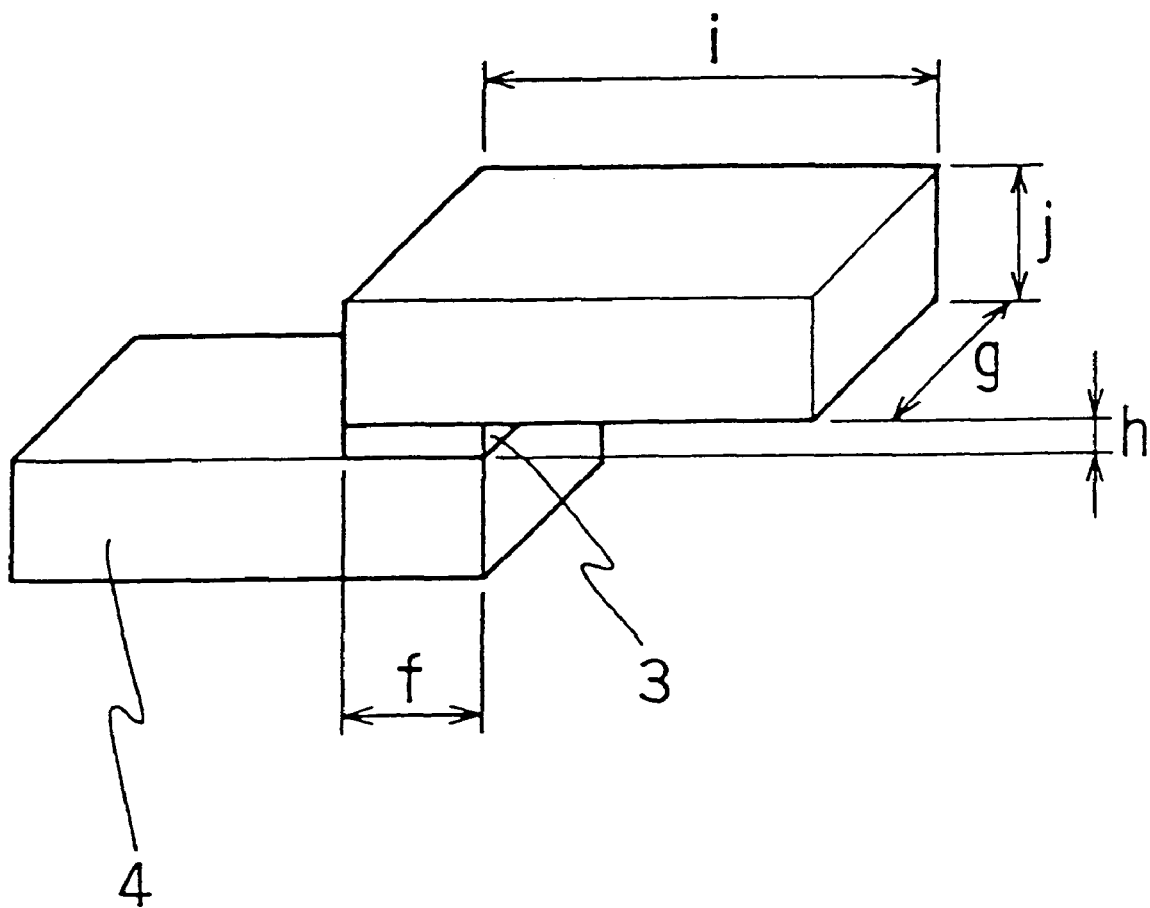
FIG. 3 is a diagrammatic perspective view of a test piece to be subjected to adhesion test (tensile shearing test) in the present invention.

FIG. 3 is a diagrammatic perspective view of a test piece for tensile shear test. As shown in Table 3, the PFA film having hydroxyl as an adhesive layer 3 which was obtained in Preparation Example 8 or 9 (length f of 10 m, width g of 20 mm, thickness h of 0.1 mm) was put between the Pyrex glass plates 4 (length i of 30 m, width g of 20 mm, thickness j of 5 mm), and a load of 3 kg was applied, followed by allowing to stand at 350° C. for 30 minutes in an electric oven to give a test piece. A thickness of the adhesive layer 3 was adjusted to 0.1 mm with a spacer.

(Adhesive Strength)

Figure 4:
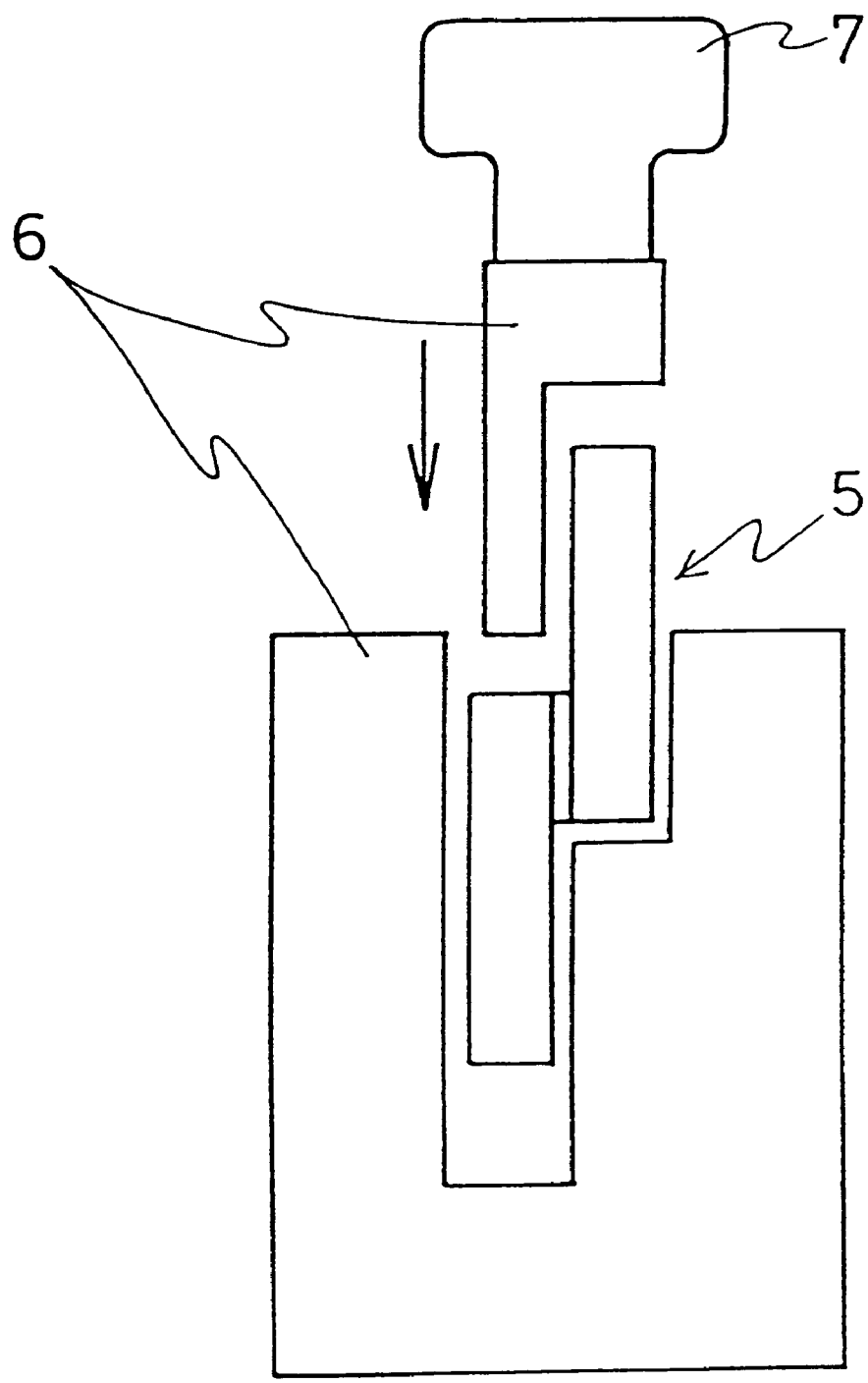
FIG. 4 is a diagrammatic view of a test device to be used for adhesion test (tensile shearing test) in the present invention.

FIG. 4 is a diagrammatic perspective view of a test device to be used for measuring adhesive strength by tensile shearing method. As shown in FIG. 4, the test piece 5 obtained as mentioned above and test jigs 6 matching the shape of the test piece were set on TENSILON Universal Tester 7 available from Orientec Corporation, and then the tensile shearing test was carried out at a cross head speed of 20 mm/min. The results of the measurement are shown by maximum adhesive strength (kgf/cm$^2$).

(Hot Water Resistance Test)

The test piece obtained as mentioned above was dipped in 50° C. hot water to check to see adhesion after a lapse of 6 hours and measure adhesive strength (kgf/cm$^2$) after a lapse of 72 hours.

(Methanol Dipping Test)

The test piece obtained as mentioned above was dipped in methanol of room temperature to check to see its adhesion.

Comparative Example 3
(Adhesion of Film of PFA Having No Functional Group to Glass)

Production of a test piece and various tests were carried out in the same manner as in Example 3 except that the PFA film having no functional group and obtained in Preparation Example 10 was used instead of the PFA film having hydroxyl and obtained in Preparation Example 8 or 9. The results are shown in Table 1.

TABLE 1

|  | Ex. 3 | Ex. 4 | Com. Ex. 3 |
|---|---|---|---|
| Kind of fluorine-containing adhesive | Prep. Ex. 8 | Prep. Ex. 9 | Prep. Ex. 10 |
| Kind of substrate | Pyrex glass | Pyrex glass | Pyrex glass |
| Adhesive strength (kgf/cm$^2$) | 83 or more | 83 or more | 59 |
|  | Breaking of glass | Breaking of glass | Peeled |
| Hot water resistance test (50° C.) |  |  |  |
| 6 hours after | Adhesion was maintained. | Adhesion was maintained. | Spontaneously peeled |
| Adhesive strength (kgf/cm$^2$) after 72-hour dipping | 63 | 10 | — |
| Methanol dip test (room temperature) |  |  |  |
| 24 hours after | Adhesion was maintained. | — | Spontaneously peeled |
| 72 hours after | Adhesion was maintained. | — | — |

Example 5
(Lamination of PFA Film Having Hydroxyl to Glass and Transparency Thereof)

(Production of Laminated Article of Film to Glass)

Figure 5:
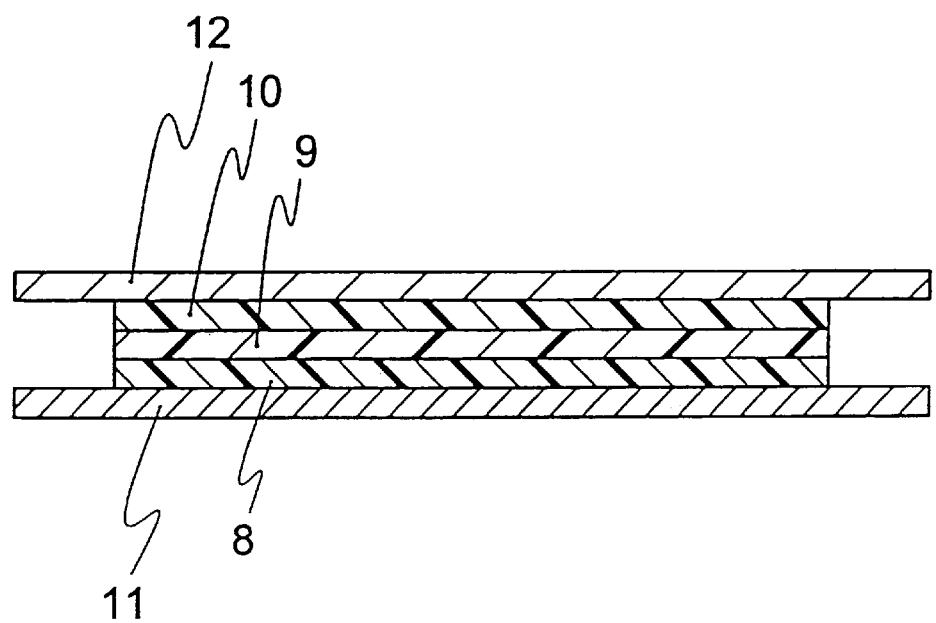
FIG. 5 is a diagrammatic cross-sectional view of a laminated test plate for making a laminated article in Example 5 of the present invention.
Figure 6:
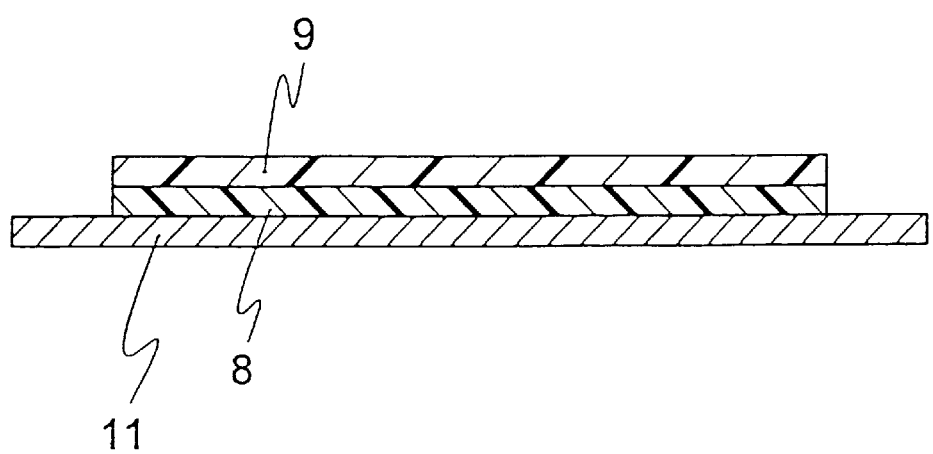
FIG. 6 is a diagrammatic cross-sectional view of a laminated article made in Example 5 of the present invention.

FIG. 5 is a diagrammatic cross-sectional view of a laminated test plate made to obtain a laminated article for testing durability of adhesion. As shown in FIG. 5, a laminated test plate was produced by placing, on a glass plate 11 of 150 mm long×70 mm wide×2.0 mm thick, a 100 μm thick hydroxyl-containing PFA film 8 obtained in Preparation Example 11 by cutting to the same size (150×70 mm) as that of the glass plate 11, then placing, on the PFA film 8, a PFA film 9 having no functional group (film of Preparation Example 13) and polyimide film 10 (Kapton 200-H available from E. I. Du Pont) which are 100 μm thick and have the same size as the glass plate and further an aluminum plate 12 having the same size as the glass plate, setting them on a press machine of 350° C., preheating (20 minutes) and then compressing at about 20 kg/cm² for one minute. After cooling, the aluminum plate 12 and polyimide film 10 were removed to give a glass plate laminated on one side thereof as shown in FIG. 6.

A total thickness of the hydroxyl-containing PFA layer and the PFA layer having no functional group excluding the glass layer was 85 μm.

(Light Transmissivity of Laminated Article Comprising Glass Plate and Hydroxyl-Containing PFA)

With respect to the laminated article of glass and PFA obtained above, transmissivity of typical visible ray range was measured by using HITACHI spectrophotometer V-3410. The results are shown in Table 2.

Comparative Example 4

With respect to the same glass plate as in Example 5, transmissivity of typical visible ray range was measured in the same manner as in Example 5. The results are shown in Table 2.

TABLE 2

| Wave length (nm) | Ex. 5 Laminated article of PFA/hydroxyl-containing PFA/glass | Com. Ex. 4 Glass |
|---|---|---|
| | Light transmissivity (%) | |
| 400 | 81.5 | 89.7 |
| 450 | 85.5 | 91.2 |
| 500 | 87.5 | 91.9 |
| 550 | 88.6 | 91.7 |
| 600 | 89.6 | 91.6 |
| 650 | 90.2 | 91.9 |
| 700 | 90.3 | 91.6 |

From Table 2, it can be seen that the laminated article of PFA/hydroxyl-containing PFA/glass exhibits good transparency.

Example 6

(Durability of Laminated Article of Hydroxyl-Containing PFA Film and Glass)
(Production of Laminated Article for Durability Test)

FIG. 5 is a diagrammatic cross-sectional view of a laminated test plate made to obtain a laminated article for adhesion durability test. As shown in FIG. 5, the hydroxyl-containing PFA film 8 obtained in Preparation Example 12 and cut to 120 mm long×40 mm wide was placed on the center of a glass plate 11 of 150 mm long×70 mm wide, and further thereon were placed a PFA film 9 having no functional group (film of Preparation Example 13) and a polyimide film 10 (the same one as in Example 5) which have the same size as that of the film 8. Further thereon was placed an aluminum plate 12 having the same size as that of the glass plate 11. Then they were set on a press machine of 350° C., followed by preheating (20 minutes) and compressing at about 20 kg/cm² for one minute to give a laminated test plate. After cooling, the aluminum plate 12 and polyimide film 10 were removed to give a laminated article for durability test.

FIG. 6 is a diagrammatic cross-sectional view of the obtained laminated article for durability test.
(Weather Resistance Test)

The laminated article comprising the hydroxyl-containing PFA film 8 as an adhesive layer, the PFA film 9 and the glass plate 11 was put in I-SUPER UV tester (available from Iwasaki Denki Kabushiki Kaisha) to carry out an accelerated weather resistance test. When there was no change in appearance, it was evaluated as ○.
(Heat Resistance Test)

The above-mentioned laminated article was allowed to stand in the 200° C. atmosphere for 12 hours. When there was no change in appearance, it was evaluated as ○.
(Temperature/Humidity Cycle)

Twenty cycles of temperature/humidity cycle test of −40° C./one hour and 85° C./85% RH/four hours were carried out. When there was no change in appearance, it was evaluated as ○.

The results of the above-mentioned various tests are shown in Table 3.

Comparative Example 5

(Durability of Laminated Article of PFA Having no Functional Group and Glass)

A laminated article for testing was produced and a durability test was carried out in the same manner as in Example 6 except that the PFA film having no functional group and produced in Preparation Example 13 was used instead of a PFA film having hydroxyl. The results are shown in Table 3.

Comparative Example 6

(Durability of Laminated Article of Surface-Treated FEP/EVA Film/Glass)

The same procedures as in Example 6 were repeated except that a EVA film (BONDFAST 7B available from Sumitomo Chemical Co., Ltd., thickness: 200 μm) was used as an adhesive layer instead of the hydroxyl-containing PFA film, a FEP film (NEOFLON FEP Film NF-0100B1 available from DAIKIN INDUSTRIES, LTD.), one surface of which was treated, was used instead of the PFA film having no functional group and the treated surface was brought into contact to the EVA film, followed by press-adhering at a temperature of 180° C. Thus a laminated article of surface-treated FEP/EVA/glass was obtained. A durability test was carried out by using the obtained laminated article in the same manner as in Example 6. The results are shown in Table 3.

Comparative Example 7

(Heat Resistance and Durability of Fluorine-Containing Polymer Prepared by Using Non-Fluorine-Containing Monomer Having Functional Group)

A 1% thermal decomposition temperature of the fluorine-containing copolymer obtained in Preparation Example 7 which was measured according to TGA analysis was 220° C. It was seen that a fluorine-containing copolymer obtained by using a non-fluorine-containing monomer having functional group like the polymer of Preparation Example 7 has a low heat resistance. Further the fluorine-containing polymer obtained in Preparation Example 7 was dissolved in butyl acetate in a concentration of 10% by weight.

The butyl acetate solution of the fluorine-containing polymer of Preparation Example 7 was applied to the same glass plate as in Example 5 by air spraying so that a coating thickness would become about 10 μm, followed by infrared drying at 90° C. for ten minutes. Durability test was carried out in the same manner as in Example 6 by using the obtained coated plate. The results are shown in Table 3.

TABLE 3

|  | Ex. 6 | Com. Ex. 5 | Com. Ex. 6 | Com. Ex. 7 |
|---|---|---|---|---|
| Laminated article | PFA/OH-containing PFA/glass | PFA/glass | Surface-treated FEP/EVA/glass | Fluorine-containing polymer of Preparation Example 7/glass |
| Weather resistance (SUV) | | | | |
| 40 hours | ○ | Completely separated | Partly separated | ○ |
| 120 hours | ○ | — | Completely separated | ○ |
| Heat resistance test | ○ | Completely separated | EVA turned yellow | Coating film turned yellow |
| Temperature/ humidity cycle test | ○ | Completely separated | ○ | — |

Example 7
(Impact Strength of Laminated Glass Having Hydroxyl-Containing PFA Layer as Adhesive Layer)
(Production of Laminated Glass)

Figure 7:
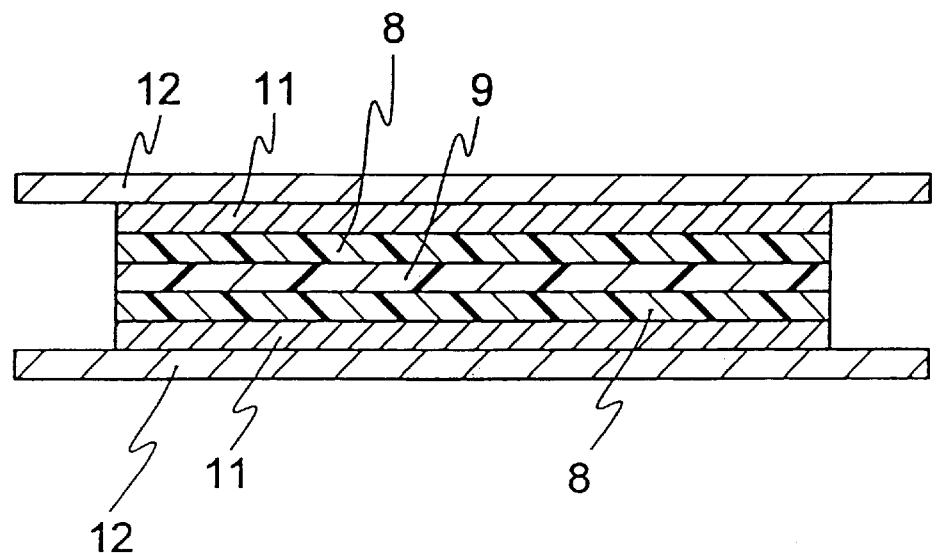
FIG. 7 is a diagrammatic cross-sectional view of a laminated test plate for making a laminated glass to be subjected to an impact resistance test in Example 7 of the present invention.

FIG. 7 is a diagrammatic cross-sectional view of a laminated test plate made to obtain a laminated glass to be subjected to impact test.

Figure 8:
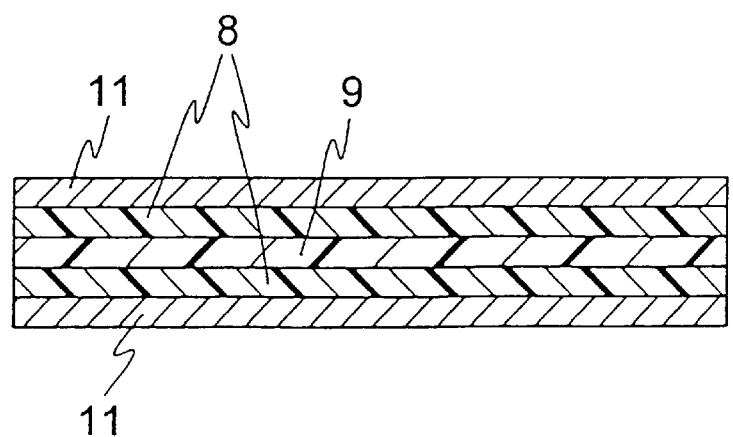
FIG. 8 is a diagrammatic cross-sectional view of a laminated glass subjected to an impact resistance test in Example 7 of the present invention.

Between two glass plates 11 of 70×70×2.0 mm were inserted two 100 μm thick hydroxyl-containing PFA films 8 (obtained in Preparation Example 11) cut to the same size as that of the glass plate, and then a 100 μm thick PFA film 9 (obtained in Preparation Example 13) having no hydroxyl and cut to the same size as that of the glass plate was inserted between the films 8 as shown in FIG. 7. Further between two aluminum plates 12 of 150×70×5.0 mm was inserted the above glass sample and set on a press machine of 350° C., followed by preheating (20 minutes) and compressing at about 27 kg/cm² for one minute. After cooling, the two aluminum plates were removed to give a laminated glass. FIG. 8 is a diagrammatic cross-sectional view of the obtained laminated glass.

(Impact Test)

An impact test was carried out by using an impact deformation tester described in B method of JIS K5400 (impact deformation test). On a tester supported horizontally were mounted an impact hitting plate and a supporting plate which have a radius of 12 mm, and the laminated glass obtained above was inserted between the two plates. A weight of 300 g was fell on the impact hitting plate from each height described in Table 4 to observe whether or not the laminated glass is broken. When it was broken, occurrence of cutting of an intermediate film and occurrence of falling glass from the film (scattered glass) were checked. If the glass was scattered, a weight of the scattered glass was measured. The results are shown in Table 4. When breaking or scattering occurred, it was evaluated as ×, and when neither abnormality nor scattering occurred, it was evaluated as ○. The weight of the scattered glass was determined by the equation:

Weight ratio (%) = (Weight of scattered article (g))/ (Weight of laminated glass (g) before test)×100

Comparative Example 8
(Impact Test of Laminated Glass Produced by Using PFA Having No Functional Group)

A laminated glass was produced in the same manner as in Example 7 except that a 100 μm thick PFA film having no functional group was used instead of the PFA film obtained in Preparation Example 11. Impact test was carried out in the same manner as in Example 7 by using the obtained laminated glass comprising glass and PFA having no functional group. The results are shown in Table 4.

TABLE 4

| | Ex. 7 | | | | Com. Ex. 8 | | | |
|---|---|---|---|---|---|---|---|---|
| Falling height (mm) | Occurrence of breakage | State of intermediate film | Occurrence of scattering | Weight ratio of scattered glass | Occurrence of breakage | State of intermediate film | Occurrence of scattering | Weight ratio of scattered glass |
| 100 | ○ | ○ | — | — | × | ○ | ○ | — |
| 300 | ○ | ○ | — | — | × | ○ | × | 7.5 |
| 500 | × | ○ | ○ | — | × | Cut | × | 17.5 |
| 1000 | × | Cut | ○ | — | × | Cut | × | 17.5 |

INDUSTRIAL APPLICABILITY

According to the present invention, it is possible to obtain a heat resistant scattering-preventing composite material which is produced by applying, to a substrate, a material comprising a fluorine-containing polymer having excellent adhesive property, without necessitating complicated steps. Further according to the present invention, it is possible to obtain the composite material which is excellent in heat resistance, stain-proofing property, water and oil repellency, stain removing property, non-sticking property, rust-preventive property, antibacterial property, resistance to energy ray and friction resistance.

What is claimed is:

1. An electric bulb, comprising a bulb having a glass surface, a layer comprising a fluorine-containing ethylenic polymer resin having functional group and a crystalline melting temperature formed directly on the glass surface and a layer comprising a fluorine-containing ethylenic polymer resin having no functional group applied on said layer comprising a fluorine-containing ethylenic polymer resin having a functional group, wherein said fluorine-containing ethylene resin having functional group is prepared by copolymerizing:
(a) 0.05 to 30 % by mole of at least one of fluorine-containing ethylenic monomers having at least one functional group selected from the group consisting of hydroxyl, carboxyl, a carboxylic salt group, a carboxylic ester group and epoxy, and
(b) 70 to 99.95 % by mole of at least one of fluorine-containing ethylenic monomers which do not have said functional group.

2. The electric bulb as claimed in claim 1, wherein said fluorine-containing ethylenic monomer (a) having functional group is at least one of fluorine-containing ethylenic monomers having functional group represented by formula (1):

$$CX_2=CX^1R_f-Y \quad (1)$$

wherein Y is —CH$_2$OH, —COOH, a carboxylic salt group, a carboxylic ester group or epoxy, X and X$^1$ are the same or different and each is hydrogen atom or fluorine atom, R$_f$ is a divalent fluorine-containing alkylene group having 1 to 40 carbon atoms, a fluorine-containing oxyalkylene group having 1 to 40 carbon atoms, a fluorine-containing alkylene group having ether bond and 1 to 40 carbon atoms or a fluorine-containing oxyalkylene group having ether bond and 1 to 40 carbon atoms.

3. The electric bulb according to claim 1, wherein said fluorine-containing ethylenic monomer (b) which does not have said functional group is a monomer mixture of 85 to 99.7 % by mole of tetrafluoroethylene and 0.3 to 15 % by mole of a monomer represented by the formula (2):

$$CF_2=CF-Rf_f^1 \quad (2)$$

wherein Rf$_f^1$ is CF$_3$ or OR$_f^2$, in which R$_f^2$ is a perfluoroalkyl group having 1 to 5 carbon atoms.

4. The electric bulb as claimed in claim 1, wherein said fluorine-containing ethylenic monomer (b) which does not have said functional group is a monomer mixture of 40 to 80 % by mole of tetrafluoroethylene, 20 to 60 % by mole of ethylene and 0 to 15 % by mole of a monomer copolymerizable therewith.

5. The electric bulb as claimed in claim 1, wherein said layer comprising said fluorine-containing ethylenic polymer resin having functional group is applied to the glass surface in a form selected from the group consisting of a coating composition, an aqueous dispersion, a powder coating composition and a film.

6. The electric bulb as claimed in claim 5, wherein said layer comprising said fluorine-containing ethylenic polymer resin having functional group is applied to the glass surface in the form of a powder coating composition.

7. The electric bulb as claimed in claim 1, wherein said fluorine-containing ethylenic polymer resin having functional group is applied directly to the glass surface of the electric bulb at elevated temperatures so as to prevent scattering of the electric bulb if the electric bulb is broken.

8. A method for preventing scattering of an electric bulb made of glass which comprises applying directly, to the glass surface of the electric bulb, a material comprising a fluorine-containing ethylenic polymer resin having functional group and a crystalline melting temperature which is prepared by copolymerizing:
(a) 0.05 to 30 % by mole of at least one of fluorine-containing ethylenic monomers having at least one functional group selected from the group consisting of hydroxyl, carboxyl, a carboxylic salt group, a carboxylic ester group and epoxy, and
(b) 70 to 99.95 % by mole of at least one of fluorine-containing ethylenic monomers which do not have said functional group,
to form a layer of the fluorine-containing ethylenic polymer resin having a functional group directly on the glass surface of the electric bulb,
and then applying a fluorine-containing ethylenic polymer resin having no functional group to the layer of the fluorine-containing ethylenic polymer resin having a functional group.

* * * * *